United States Patent
Kim et al.

(10) Patent No.: US 7,227,854 B2
(45) Date of Patent: Jun. 5, 2007

(54) APPARATUS AND METHOD FOR TRANSMITTING CQI INFORMATION IN A CDMA COMMUNICATION SYSTEM EMPLOYING AN HSDPA SCHEME

(75) Inventors: Young-Bum Kim, Seoul (KR); Ju-Ho Lee, Suwon-shi (KR); Sung-Ho Choi, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 804 days.

(21) Appl. No.: 10/657,501

(22) Filed: Sep. 8, 2003

(65) Prior Publication Data
US 2004/0058687 A1    Mar. 25, 2004

(30) Foreign Application Priority Data
Sep. 6, 2002   (KR) .................. 10-2002-0054775
Sep. 13, 2002  (KR) .................. 10-2002-0055902

(51) Int. Cl.
*H04B 7/216* (2006.01)
(52) U.S. Cl. .................. 370/342; 370/335; 370/491
(58) Field of Classification Search ............. 370/342, 370/335, 329, 209, 491, 442, 537
See application file for complete search history.

(56) References Cited

U.S. PATENT DOCUMENTS

| | | | | |
|---|---|---|---|---|
| 5,835,508 A * | 11/1998 | Kushita | ................ | 714/748 |
| 7,050,759 B2 * | 5/2006 | Gaal et al. | ................ | 455/67.13 |
| 7,133,441 B1 * | 11/2006 | Barlev et al. | ................ | 375/222 |
| 2002/0141436 A1 * | 10/2002 | Toskala | ................ | 370/442 |
| 2003/0095532 A1 * | 5/2003 | Kim et al. | ................ | 370/342 |
| 2003/0185242 A1 * | 10/2003 | Lee et al. | ................ | 370/491 |

* cited by examiner

*Primary Examiner*—CongVan Tran
(74) *Attorney, Agent, or Firm*—The Farrell Law Firm

(57) ABSTRACT

A user equipment (UE) located in a soft handover region transmits channel quality indicator (CQI) information bits for informing a Node B of quality of a downlink channel through a CQI field and a high speed pilot (HS-Pilot) field constituting a subframe of an uplink secondary dedicated physical control channel (DPCCH) in a code division multiple access (CDMA) communication system. The UE outputs a codeword of length 20 by coding the CQI information bits with a code of length 20, which is used when a high speed downlink packet access (HSDPA) service is not supported, and permutes 15 coded bits coded by the same code, as a code of length 15, which is used when the HSDPA service is supported, among 20 coded bits constituting the codeword, thereby locating the 15 coded bits in the CQI field, and permutes the 5 remaining coded bits to be located in the HS-Pilot field.

15 Claims, 13 Drawing Sheets

APPARATUS AND METHOD FOR TRANSMITTING CQI INFORMATION IN A CDMA COMMUNICATION SYSTEM EMPLOYING AN HSDPA SCHEME

PRIORITY

This application claims priority under 35 U.S.C. § 119 to an application entitled "Apparatus and Method for Transmitting CQI Information in a CDMA Communication System Employing HSDPA Scheme" filed in the Korean Intellectual Property Office on Sep. 6, 2002, and assigned Serial No. 2002-54775, and an application entitled "Apparatus and Method for Transmitting CQI Information in a CDMA Communication System Employing HSDPA Scheme" filed in the Korean Intellectual Property Office on Sep. 13, 2002, and assigned Serial No. 2002-55902, the contents of both of which are incorporated herein by reference.

BACKGROUND OF THE INVENTION

1. Field of the Invention

The present invention relates generally to a mobile communication system supporting a high-speed downlink packet access (HSDPA) scheme, and in particular, to an apparatus and method for acquiring a channel quality indicator (CQI).

2. Description of the Related Art

Currently, mobile communication systems are developing into high-speed, high-quality radio packet data communication systems for providing a data service and a multimedia service as well as a conventional voice service. Recently, for a high-speed, high-quality radio packet data service, standardization of $3^{rd}$ generation mobile communication systems, which are classified into asynchronous 3GPP ($3^{rd}$ Generation Partnership Project) systems and synchronous 3GPP2 systems, is under way. For example, standardization of a high-speed downlink packet access (HSDPA) scheme is being conducted in 3GPP, while standardization of 1xEV-DV (Evolution Data and Voice) is being carried out in 3GPP2. Such standardizations are performed to find a solution for a high-speed, high-quality radio packet data service of 20 Mbps or higher in a $3^{rd}$ generation mobile communication system, and a $4^{th}$ generation mobile communication system is intended to provide a high-speed, high-quality multimedia service supporting a rate higher than that of the $3^{rd}$ generation mobile communication system.

The HSDPA scheme refers to a high speed downlink shared channel (HS-DSCH) for supporting high speed downlink packet transmission in a code division multiple access (CDMA) mobile communication system, control channel related thereto, and a system as well as an apparatus and method therefore.

FIG. 1 schematically illustrates configuration of an asynchronous mobile communication system supporting an HSDPA scheme. Referring to FIG. 1, the asynchronous mobile communication system is comprised of a core network (CN) 100, a plurality of radio network subsystems (RNS) 110 and 120, and a user equipment (UE) 130. The RNS 110 includes a radio network controller (RNC) 111, and a plurality of Node Bs 115 and 113, and the RNS 120 also includes an RNC 112 and a plurality of Node Bs 114 and 116. Herein, for the convenience of explanation, the terms "Node B" and "cell" will be used in the same meaning.

The RNCs 111 and 112 are divided into a serving RNC (SRNC), a drift RNC (DRNC), and a controlling RNC (CRNC) according to their roles. The SRNC and the DRNC are classified according to the functions they support to their UEs. That is, an RNC that manages information on each UE and controls data transmission to the CN 100 is called an SRNC of a corresponding UE. When data from each UE is transmitted to the SRNC via another RNC, the RNC through which the data passes is called a DRNC of a corresponding UE. An RNC that controls each Node B is called a CRNC of a corresponding Node B. For example, in FIG. 1, if information on the UE 130 is managed by the RNC 111, the RNC 111 becomes an SRNC of the UE 130. Also, if data from the UE 130 is transmitted to the SRNC via the RNC 112 as the UE 130 moves, the RNC 112 becomes a DRNC of the UE 130. Further, the RNC 111 that controls the Node B 113 becomes a CRNC for the Node B 113.

The HSDPA scheme is a gathering of technologies for high-speed downlink data transmission in an asynchronous mobile communication system, and standardization thereof is being carried out in 3GPP, as stated above. However, many parts of the HSDPA scheme are still under discussion. Therefore, undefined subject matters of the HSDPA scheme will be described herein based on the discussion results up to the present.

In an asynchronous mobile communication system, high-speed downlink data transmission is realized with user of a plurality of OVSF (Orthogonal Variable Spreading Factor) codes, adaptive channel coding, and HARQ (Hybrid Automatic Retransmission Request). The HARQ can be realized with a fast retransmission and soft combining scheme. In the HSDPA scheme, the maximum number of OVSF codes that can be applied to one UE is 15, and QPSK (Quadrature Phase Shift Keying), 16QAM (16-ary Quadrature Amplitude Modulation), and 64QAM (64-ary Quadrature Amplitude Modulation) are adaptively selected as modulation schemes according to a channel condition. In addition, defective data is retransmitted between a UE and a Node B, and then, the retransmitted data is soft-combined, thereby improving the entire communication efficiency. Such a retransmission scheme is called "n-channel SAW HARQ (Stop And Wait Hybrid Automatic Retransmission Request)."

The OVSF codes used to support the HSDPA scheme can be simultaneously used by a plurality of UEs. That is, the OVSF codes can be simultaneously multiplexed to the UEs. This will be described in more detail with reference to FIG. 2.

FIG. 2 illustrates a conventional method of assigning OVSF codes in a mobile communication system supporting an HSDPA scheme. In describing FIG. 2, it will be assumed that a spreading factor is 16 (SF=16).

Referring to FIG. 2, OVSF codes are represented by C(i,j) according to their positions in a code tree. In the C(i,j), i denotes spreading factor value and j denotes an order of a corresponding code from the leftmost side of the OVSF code tree. For example, C(16,0) indicates an OVSF code located in the first position from the left in a row with a spreading factor 16 (SF=16). FIG. 2 illustrates a method for assigning 15 SF=16 OVSF codes C(16,0) to C(16,14) in the OVSF code tree to a communication system supporting an HSDPA scheme. The 15 OVSF codes can be multiplexed to a plurality of UEs, and an example of the multiplexed OVSF codes is illustrated below in Table 1.

TABLE 1

| | UE #A | UE #B | UE #C |
|---|---|---|---|
| t0 | C(16,0)~C(16,5) | C(16,6)~C(16,10) | C(16,11)~C(16,14) |
| t1 | C(16,0)~C(16,3) | C(16,4)~C(16,14) | — |
| t2 | C(16,0)~C(16,3) | C(16,4)~C(16,5) | C(16,6)~C(16,14) |

In Table 1, UE #A, UE #B, and UE #C are UEs using a mobile communication system supporting the HSDPA scheme. As illustrated in Table 1, at times t0, t1, and t2, the UE #A, UE #B, and UE #C are code-multiplexed using OVSF codes assigned thereto. The number of OVSF codes assigned to the UEs and the positions of the OVSF codes in the OVSF code tree are determined by the Node B. The Node B determines the number and positions of the OVSF codes considering an amount of user data of each UE, stored in the Node B, and conditions of channels set up between the Node B and the UEs.

Therefore, control information exchanged between a UE and a Node B includes (i) code information indicating the number of OVSF codes to be used by a particular UE and positions of the OVSF codes in the code tree, (ii) channel quality information and modulation scheme information necessary for adaptively determining a modulation scheme according to a channel condition, and (iii) channel number information and ACK/NACK (Acknowledge/Negative Acknowledge) information necessary for supporting n-channel SAW HARQ.

Commonly, channels used in a mobile communication system to support an HSDPA scheme are classified into downlink channels and uplink channels. The downlink channels include a high-speed shared control channel (HS-SCCH), an associated dedicated physical channel (Associated DPCH), and a high-speed physical downlink shared channel (HS-PDSCH). The uplink channels include an uplink secondary dedicated physical control channel (HS-DPCCH).

Timing relations between the respective channels are illustrated in FIG. 3. A UE first measures channel quality between the UE itself and a Node B, using a primary common pilot channel (PCPICH), and then notifies the measurement result to the Node B using a channel quality indicator (CQI). The CQI is transmitted over the HS-DPCCH. The Node B then performs scheduling using the CQI. The scheduling determines a UE that will actually receive data for a next transmission time interval (TTI), among a plurality of UEs receiving an HSDPA service in the same cell. In addition, the scheduling refers to an operation of determining a modulation scheme to be used for corresponding data transmission and the number of codes to be assigned. When data transmission for a particular UE is determined, the Node B transmits control information necessary for receiving the corresponding data, over HS-SCCH. At this point, the UE can identify the HS-SCCH to be received, using a UE ID (Identifier). In addition, the UE needs to receive only a maximum of 4 HS-SCCHs considering complexity. However, a cell facilitates scheduling of packet data by managing 4 or more HS-SCCHs. A set of HS-SCCHs assigned to one UE is referred to as a "serving HS-SCCH set." The serving HS-SCCH set can be designated according to UEs. Other details of this process will be described herein below.

Control information included in the HS-SCCH includes 7-bit information (code information) on OVSF codes to be used for HS-PDSCH, 1-bit information indicating a modulation scheme to be applied to HS-PDSCH, 6-bit information indicating a size of data transmitted over HS-PDSCH, and HARQ-related information. The HARQ-related information is comprised of a total of 7 bits: 1 bit for a new data indicator indicating whether data to be transmitted over HS-PDSCH is new data or not, 3 bits for a redundancy version (RV) of data to be transmitted over HS-PDSCH, and 3 bits for a channel number of data to be transmitted over HS-PDSCH in n-channel SAW HARQ.

FIG. 4 illustrates a conventional structure of the HS-SCCH. As illustrated in FIG. 4, the HS-SCCH is transmitted using an SF=128 OVSF code, and divided into 3 parts of Part-1, Part-2, and CRC. The 8-bit Part-1 information is transmitted over a first slot having 40 bits among the slots constituting an HS-SCCH frame, and the 13-bit Part-2 information and the 16-bit CRC are transmitted over second and third slots having 80 bits among the slots constituting the HS-SCCH frame. Because the Part-1 information and the Part-2 information are separately channel-coded in this way, a terminal can identify which of the 4 HS-SCCHs transmits control information for HS-PDSCH reception, by simply receiving only a first slot that transmits the Part-1 information.

The Part-1 includes code information indicting the number and positions of OVSF codes in the OVSF code tree, to be used by a corresponding UE, and modulation scheme information.

FIG. 5 illustrates a UE ID-based scrambling device for UE identification after channel coding Part-1 information and receiving the Part-1 information. Referring to FIG. 5, the Part-1 information is coded by an R=½ convolutional code (or a convolutional code with a rate=½), and then rate-matched to 40 bits corresponding to one slot. A 10-bit UE ID is coded with 32 bits by a (32,10) block code used for TFCI coding in Rel'99 standard, and then extended to 40 bits by repetition, which are XOR-ed with 40 bits of a first slot thereby performing scrambling according to UE IDs.

Part-2 includes transport block (TB) size information indicating a size of data transmitted over HS-PDSCH, a channel number of n-channel SAW HARQ, a new data indicator indicating whether corresponding data is new data or retransmitted data, and a redundancy version indicating a version of corresponding data in IR (Incremental Redundancy).

Finally, the CRC is filled with a CRC operation result for the Part-1 information and the UE identifier. It is expected that 10 bits are used for the UE identifier. That is, though not actually transmitted, the CRC is calculated along with the UE identifier in a transmission side. The CRC is calculated together with the UE identifier even in a reception side. By doing so, a UE can determine whether information contained in a particular HS-SCCH is information for the UE. For example, when transmitting control information to a particular UE #a using HS-SCCH, a Node B calculates CRC using Part-1, Part-2, and an identifier of the UE #a. When the UE #a calculates the CRC using its own UE identifier, Part-1 and Part-2 altogether, if no CRC error occurs, the UE #a determines that HS-SCCH transmits control information for the UE #a itself.

In order for a UE to receive the HS-SCCH, the UE receives control information necessary for HS-PDSCH reception by generating a scrambling sequence with a stored UE ID, performing descrambling on first slots of 4 HS-SCCHs, and then identifying HS-SCCH assigned thereto while performing Viterbi decoding on a convolutional code. After receiving the control information of HS-SCCH, the UE calculates CRC using Part-1 information, Part-2 information, and its own UE ID to determine whether an error has occurred. If no error has occurred, the UE continuously decodes HS-PDSCH information, determining that control information for the UE was received with error. However, if a CRC error has occurred, the UE suspends decoding of HS-PDSCH information.

Based on the information received over the HS-SCCH, the UE receives data transmitted over HS-PDSCH, demodulates the received data, and performs accordingly. At this point, the UE determines through which OVSF code it will receive HS-PDSCH, based on code information, and determines in which modulation scheme it will modulate the received HS-PDSCH, based on modulation information. After completion of this process, the UE determines through a CRC operation whether an error has occurred in corresponding data, and then transmits ACK/NACK information according to the CRC operation result. That is, if no error has occurred, the UE transmits an ACK, but if an error has occurred, the UE transmits a NACK.

The UE transmits ACK/NACK for packet data and CQI information for a downlink channel condition over HS-DPCCH. A structure of an HS-DPCCH is illustrated in FIG. 6. As illustrated in FIG. 6, a spreading factor of the HS-DPCCH is SF=256, and an HS-DPCCH subframe is comprised of 3 slots. The HS-DPCCH subframe transmits ACK/NACK information over its first slot, and transmits CQI information over its second and third slots. At this point, 1-bit ACK/NACK information is repeated 10 times, so the ACK/NACK information is transmitted with 10 bits. 5-bit CQI information is (20,5) channel-coded and transmitted with 20 bits.

When a UE supporting the conventional HSDPA scheme is located in a soft handover region, the UE uses an uplink power control method in which it determines whether it will transmit an HS-Pilot, according to a presence/absence of HS-PDSCH packet data. That is, when a UE supporting the conventional HSDPA scheme is located in a soft handover region, neighbor Node Bs transmit HS-PDSCH to the UE through a downlink. In order to enable a Node B receiving HS-DPCCH from the UE to efficiently perform channel compensation and power control on HS-DPCCH, an HS-Pilot can be inserted in the HS-DPCCH as is illustrated in FIG. 7. Therefore, the Node B can perform channel estimation, channel compensation and power control on the HS-DPCCH using the HS-Pilot, independently of an existing uplink DPCCH.

However, in the channel compensation and power control method using an HS-Pilot, when a UE is located in a soft handover region, even though there is no packet data transmitted over HS-PDSCH, the HS-Pilot is continuously transmitted, causing continuous uplink interference to a non-serving cell.

In order to solve this problem, the UE can transmit an HS-Pilot only in a period where it transmits ACK/NACK information after detecting the HS-SCCH, and then perform power control on the HS-DPCCH using the HS-Pilot. Although interference by transmission of HS-Pilot can be reduced by doing so, a CQI coding method must be changed to (20,5) and (15,5) coding methods according to whether the HS-Pilot is transmitted.

The method of changing a coding rate of the CQI information must be performed according to HS-SCCH detection at a UE. That is, upon detecting the HS-SCCH transmitted from a Node B, the UE encodes CQI information at a coding rate (15,5) before transmission, and upon failure to detect the HS-SCCH, the UE encodes the CQI information at a coding rate (20,5) before transmission.

However, there is probability that an HS-SCCH transmission/reception error will occur between a Node B and a UE. In this case, the UE fails to detect the HS-SCCH, and thus encodes CQI information at a coding rate (20,5) before transmission. In this situation, because a Node B has already transmitted HS-PDSCH packet data to a corresponding UE, the Node B expects that CQI information of the HS-DPCCH was encoded at a coding rate (15,5). Therefore, a coding rate and a decoding rate for CQI information between the UE and the Node B are mismatched, and the Node B cannot acquire correct CQI information. More specifically, when the HS-SCCH is not normally delivered from the Node B to the UE, CQI information cannot be correctly delivered from the UE to the Node B.

SUMMARY OF THE INVENTION

It is, therefore, an object of the present invention to provide an apparatus and method for increasing transmission reliability of channel quality indicator (CQI) information even when an HS-SCCH detection error occurs at a user equipment (UE).

It is another object of the present invention to provide an apparatus and method for securing high CQI acquisition reliability in a mobile communication system supporting a high-speed downlink packet access (HSDPA) scheme.

It is yet another object of the present invention to provide an apparatus and method for increasing CQI information acquisition reliability of a Node B when an HS-SCCH detection error occurs at a UE, when in supporting an HSDPA scheme, the UE is located in a soft handover region, determines transmission/non-transmission of HS-Pilot according to detection/non-detection of HS-SCCH, and changes a channel coding method of CQI information according to the determination result.

According to a first aspect of the present invention, there is provided a method for transmitting, by a user equipment (UE) located in a soft handover region, channel quality indicator (CQI) information bits for informing a Node B of a quality of a downlink channel through a CQI field and a high speed pilot (HS-Pilot) field constituting a subframe of an uplink secondary dedicated physical control channel (DPCCH) in a code division multiple access (CDMA) communication system. The method comprises the steps of: outputting a codeword of length 20 by encoding the CQI information bits with a code of length 20, which is used when a high speed downlink packet access (HSDPA) service is not supported; and permuting 15 coded bits coded by the same code as a code of length 15, which is used when the HSDPA service is supported, among coded bits constituting the codeword, thereby locating the 15 coded bits in the CQI field, and permuting the remaining coded bits to be located in the HS-Pilot field.

According to a second aspect of the present invention, there is provided an apparatus for transmitting, by a user equipment (UE) located in a soft handover region, channel quality indicator (CQI) information bits for informing a Node B of quality of a downlink channel through a CQI field and a high speed pilot (HS-Pilot) field constituting a subframe of an uplink secondary dedicated physical control channel (DPCCH) in a code division multiple access (CDMA) communication system. The apparatus comprises a coder for outputting a codeword of length 20 by encoding the CQI information bits with a code of length 20, which is used when a high speed downlink packet access (HSDPA) service is not supported; and a permuter for permuting 15 coded bits coded by the same code as a code of length 15 which is used when the HSDPA service is supported, among 20 coded bits constituting the codeword, thereby locating the 15 coded bits in the CQI field, and permuting the remaining coded bits to be located in the HS-Pilot field.

According to a third aspect of the present invention, there is provided a method for receiving channel quality indicator (CQI) information bits in a Node B for a code division multiple access (CDMA) communication system when the CQI information bits indicating quality of a downlink channel are permuted and then transmitted from a user equipment (UE) located in a soft handover region through a CQI field and a high speed pilot (HS-Pilot) field constituting a subframe of an uplink secondary dedicated physical control channel (DPCCH). The method comprises the steps of: outputting a codeword of length 20 by permuting CQI information bits transmitted through the CQI field and the HS-Pilot field in the opposite order of permutation performed by the UE; and outputting the CQI information bits by decoding 20 coded bits constituting the codeword into a code of length 20, if a high speed downlink packet access (HSDPA) service is being provided to the UE, and decoding 20 coded bits constituting the codeword into a code of length 15, if the HSDPA service is not being provided to the UE.

According to a fourth aspect of the present invention, there is provided an apparatus for receiving channel quality indicator (CQI) information bits in a Node B for a code division multiple access (CDMA) communication system when the CQI information bits indicating quality of a downlink channel are permuted and then transmitted from a user equipment (UE) located in a soft handover region through a CQI field and a high speed pilot (HS-Pilot) field constituting a subframe of an uplink secondary dedicated physical control channel (DPCCH). The apparatus comprises a permuter for outputting a codeword of length 20 by permuting the CQI information bits transmitted through the CQI field and the HS-Pilot field in the opposite order of permutation performed by the UE; and a decoder for outputting the CQI information bits by decoding 20 coded bits constituting the codeword into a code of length 20, if a high speed downlink packet access (HSDPA) service is being provided to the UE, and decoding 20 coded bits constituting the codeword into a code of length 15, if the HSDPA service is not being provided to the UE.

According to a fifth aspect of the present invention, there is provided a method for transmitting channel quality indicator (CQI) information bits for informing a Node B of quality of a downlink channel through a subframe of an uplink secondary dedicated physical control channel (DPCCH) in a user equipment (UE) located in a soft handover region for a code division multiple access (CDMA) communication system. The method comprises the steps of: outputting a codeword of length 20 by encoding the CQI information bits with a basis vector stream generated by moving $16^{th}$ and $17^{th}$ basis vectors in a basis vector stream of length 20 used when a high speed downlink packet access (HSDPA) service is not supported, to positions of $1^{st}$ and $2^{nd}$ basis vectors and shifting basis vectors in $1^{st}$ to $15^{th}$ positions; and sequentially arranging 20 coded bits constituting the codeword in a CQI field and a high speed pilot (HS-Pilot) field constituting the subframe.

According to a sixth aspect of the present invention, there is provided an apparatus for transmitting channel quality indicator (CQI) information bits for informing a Node B of quality of a downlink channel through a CQI field and a high speed pilot (HS-Pilot) field constituting a subframe of an uplink secondary dedicated physical control channel (DPCCH) in a user equipment (UE) located in a soft handover region for a code division multiple access (CDMA) communication system. The apparatus comprises an encoder for outputting a codeword of length 20 by encoding the CQI information bits with a basis vector stream generated by moving $16^{th}$ and $17^{th}$ basis vectors in a basis vector stream of length 20, which is used when a high speed downlink packet access (HSDPA) service is not used, to positions of $1^{st}$ and $2^{nd}$ basis vectors in the basis vector stream, and shifting $1^{st}$ to $15^{th}$ basis vectors; a controller for outputting a selection signal according to whether the HSDPA service is provided; a codeword selector for outputting only $3^{rd}$ to $17^{th}$ coded bits constituting the codeword upon receiving from the controller a selection signal indicating that the HSDPA service is provided, and outputting all of the 20 coded bits constituting the codeword upon receiving from the controller a selection signal indicating that the HSDPA service is not provided; a switch for outputting HS-Pilot bits from the HS-Pilot field upon receiving from the controller a selection signal indicting the HSDPA service is provided, and discarding the HS-Pilot bits upon receiving from the controller a selection signal indicating that the HSDPA service is not provided; and a multiplexer for multiplexing coded bits from the codeword selector and the HS-Pilot bits from the switch.

According to a seventh aspect of the present invention, there is provided a method for receiving channel quality indicator (CQI) information bits in a Node B for a code division multiple access (CDMA) communication system when the CQI information bits indicating quality of a downlink channel are permuted and then transmitted from a user equipment (UE) located in a soft handover region through a CQI field and a high speed pilot (HS-Pilot) field constituting a subframe of an uplink secondary dedicated physical control channel (DPCCH). The method comprises the steps of: extracting coded bits from the CQI field and the HS-Pilot field of the subframe; and outputting the CQI information bits by decoding the extracted coded bits with a basis vector stream generated by moving $16^{th}$ and $17^{th}$ basis vectors in a basis vector stream of length 20, which is used when a high speed packet data access (HSDPA) service is not supported, to positions of $1^{st}$ and $2^{nd}$ basis vectors, and shifting $1^{st}$ to $15^{th}$ basis vectors.

According to an eighth aspect of the present invention, there is provided an apparatus for receiving channel quality indicator (CQI) information bits in a Node B for a code division multiple access (CDMA) mobile communication system when the CQI information bits indicating quality of a downlink channel are permuted and then transmitted from a user equipment (UE) located in a soft handover region through a CQI field and a high speed pilot (HS-Pilot) field constituting a subframe of an uplink secondary dedicated physical control channel (DPCCH). The apparatus comprises a demultiplexer for extracting coded bits from the CQI field and the HS-Pilot field of the subframe; and a decoder for outputting the CQI information bits by decoding the extracted coded bits with a basis vector stream generated by moving $16^{th}$ and $17^{th}$ basis vectors in a basis vector stream of length 20, which is used when a high speed downlink packet access (HSDPA) service is not supported, to positions of $1^{st}$ and $2^{nd}$ basis vectors, and shifting $1^{st}$ to $15^{th}$ basis vectors.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will be described in detail herein below with reference to the annexed drawings. In the following description, a detailed description of known functions and configurations incorporated herein has been omitted for conciseness.

The present invention provides techniques for securing transmission reliability of channel quality indicator (CQI) information by solving a problem which may be caused by an HS-SCCH detection error at a UE when the UE is located in a soft handover region, transmits HS-Pilot according to whether HS-SCCH is detected, and changes a channel coding method of CQI information according to the determination result.

1. First Embodiment

Figure 1:
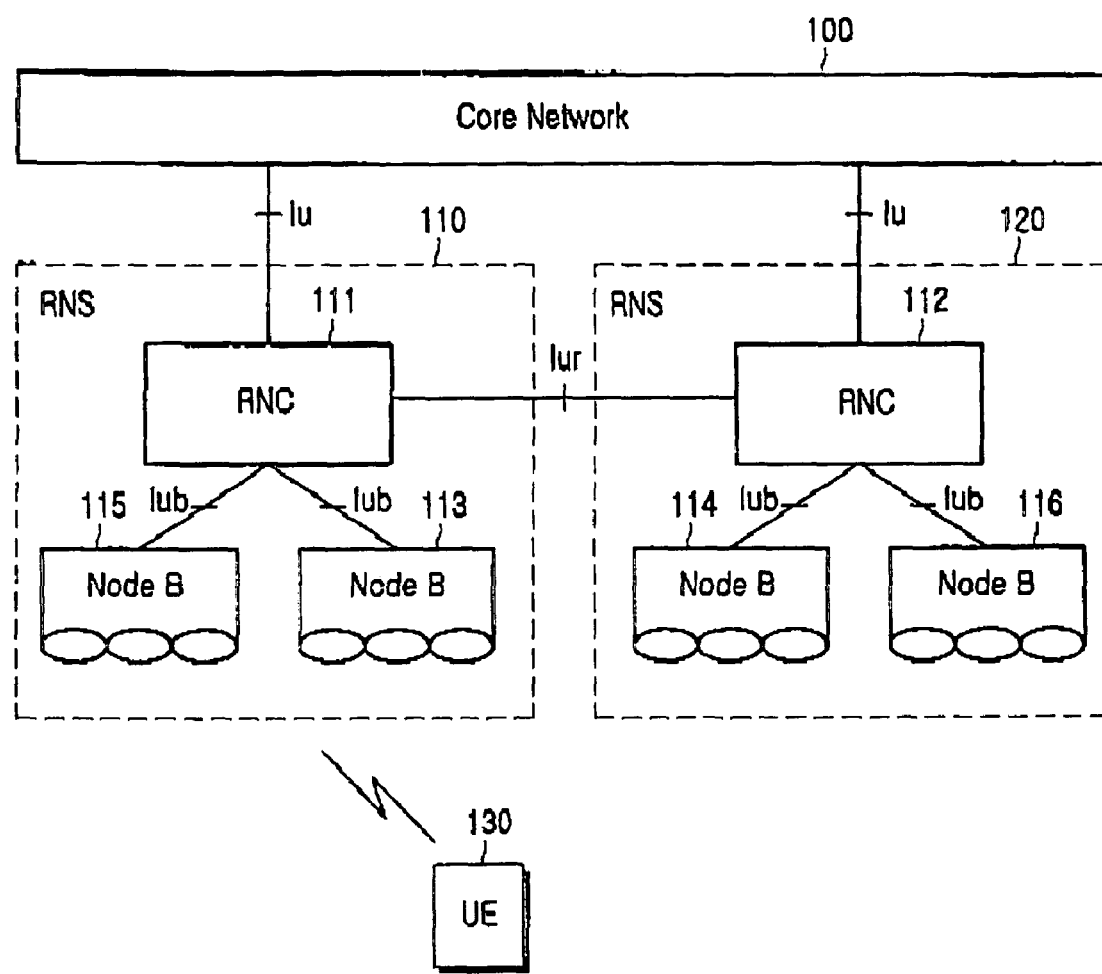
FIG. 1 schematically illustrates configuration of an asynchronous mobile communication system supporting an HSDPA scheme.
Figure 2:
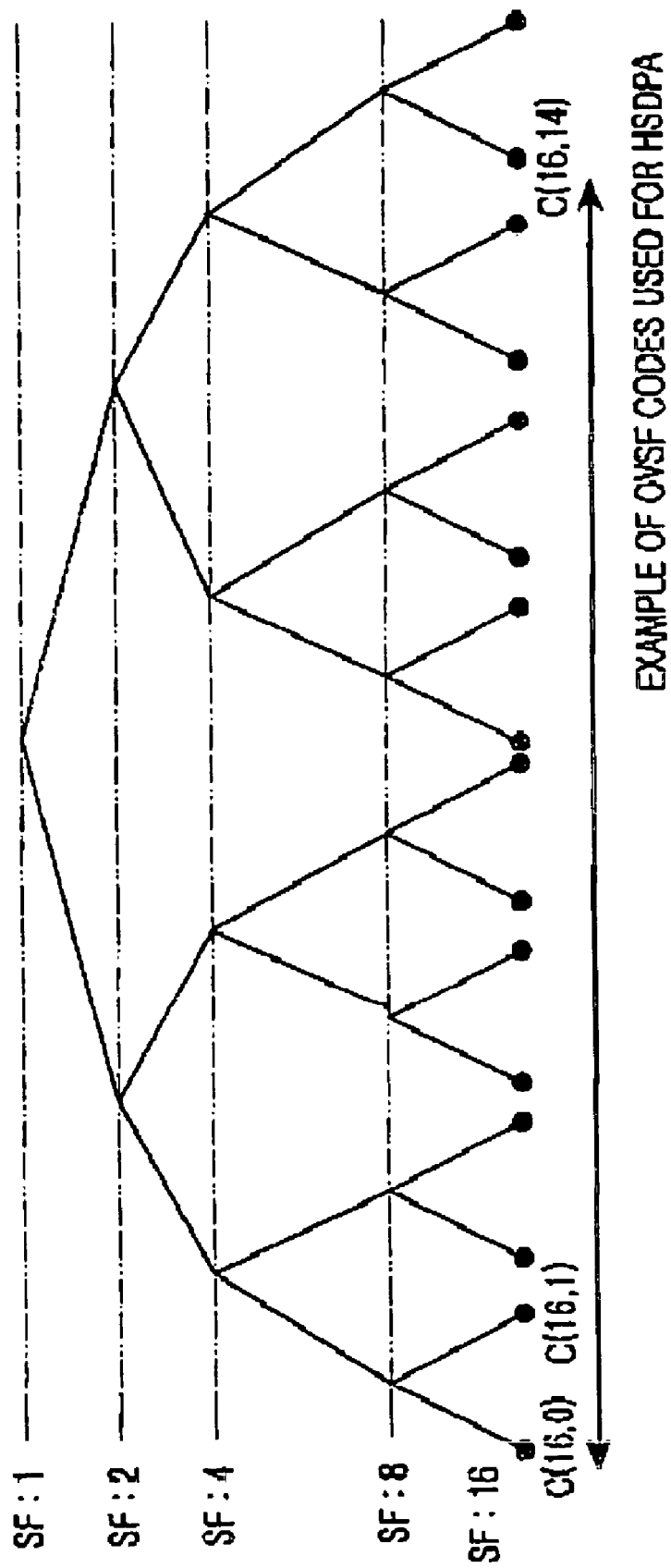
FIG. 2 illustrates an example of OVSF codes used for HSDPA in an OVSF code tree.
Figure 3:
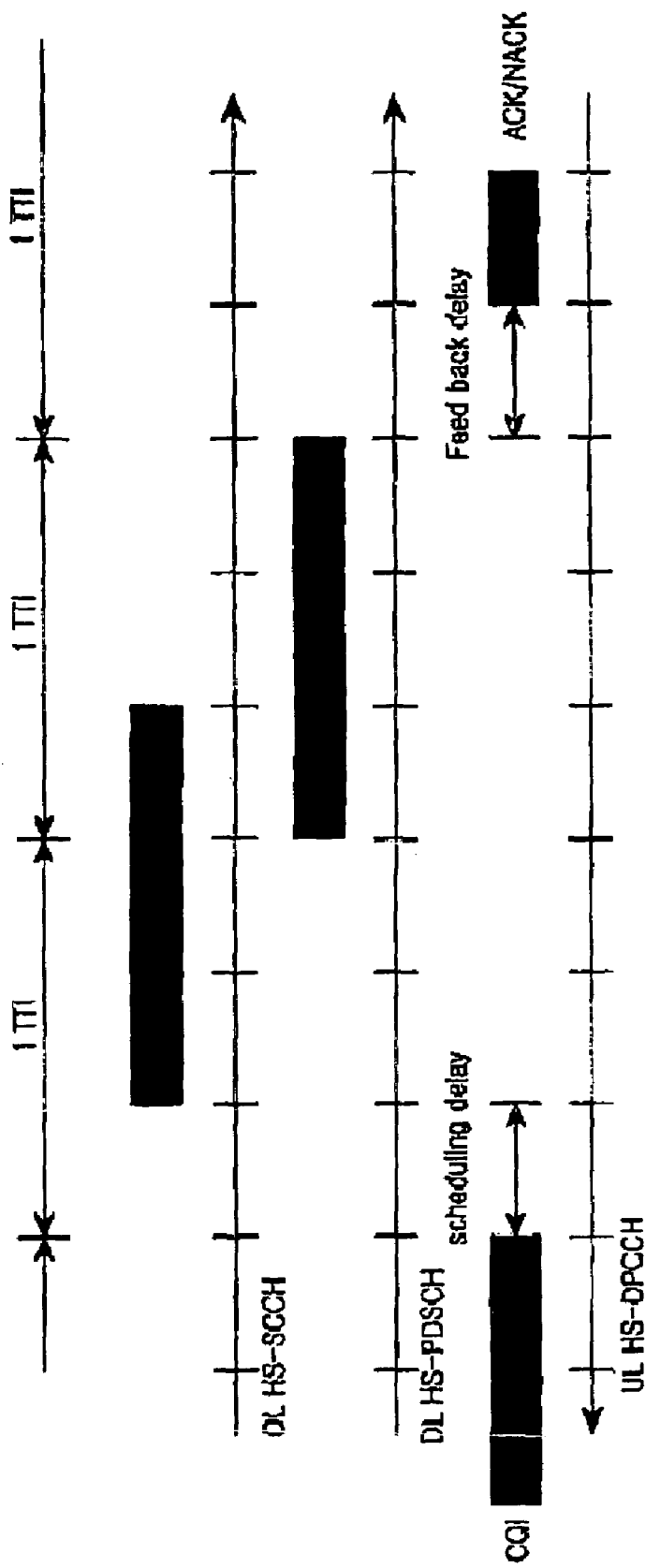
FIG. 3 illustrates a timing relation between channels used for HSDPA.
Figure 4:
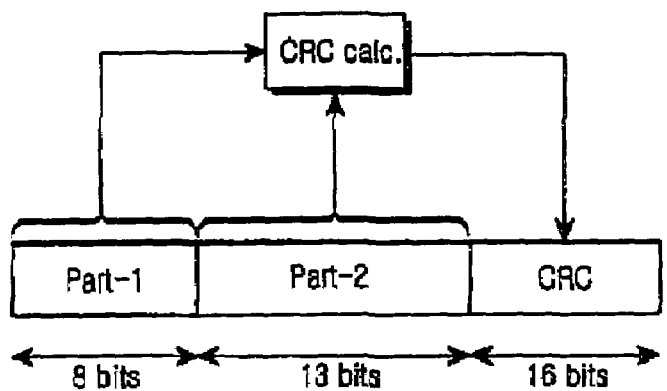
FIG. 4 illustrates a structure of an HS-SCCH channel transmitting control information for an HS-PDSCH channel.
Figure 5:
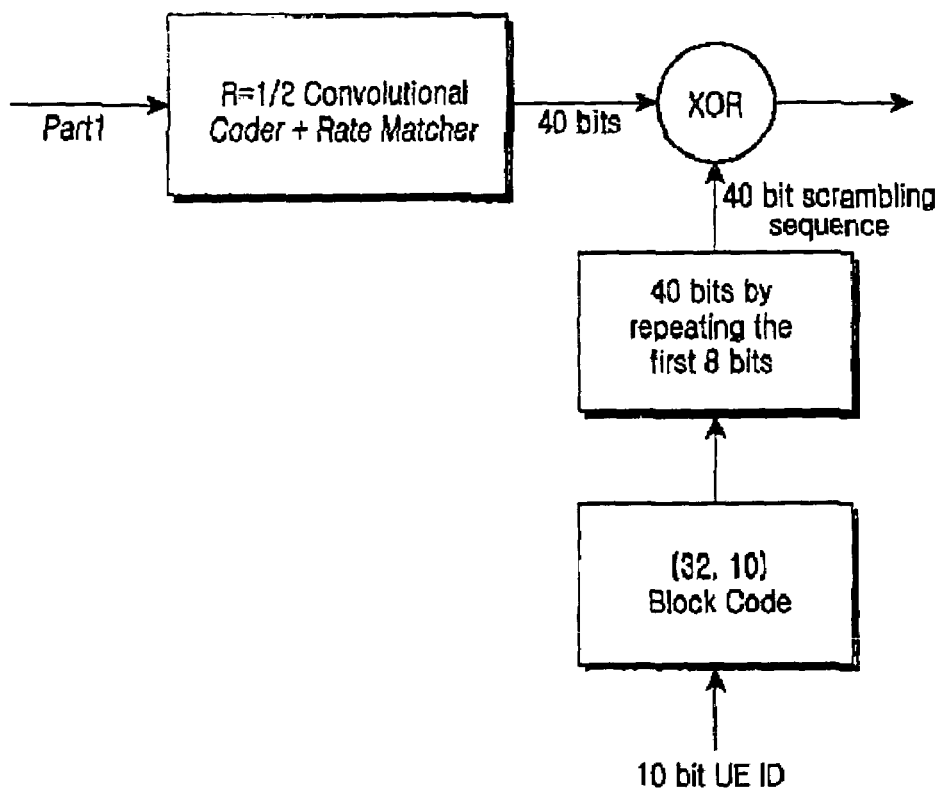
FIG. 5 illustrates a method for adding UE ID information to an HS-SCCH channel transmitting control information for an HS-PDSCH channel.
Figure 6:
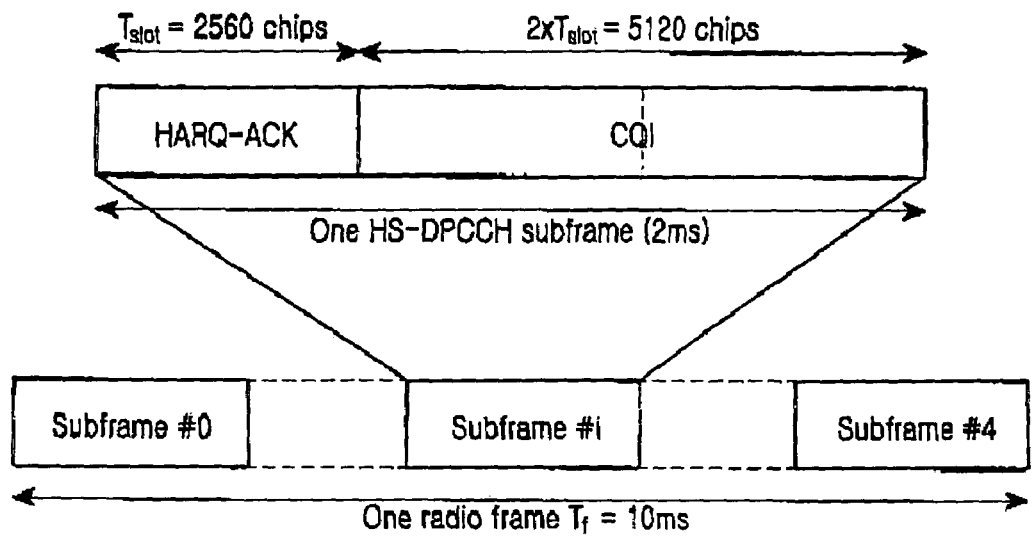
FIG. 6 illustrates a format of an HS-DPCCH channel, which is an uplink control channel for HSDPA, wherein no pilot is inserted in the HS-DPCCH.
Figure 7:
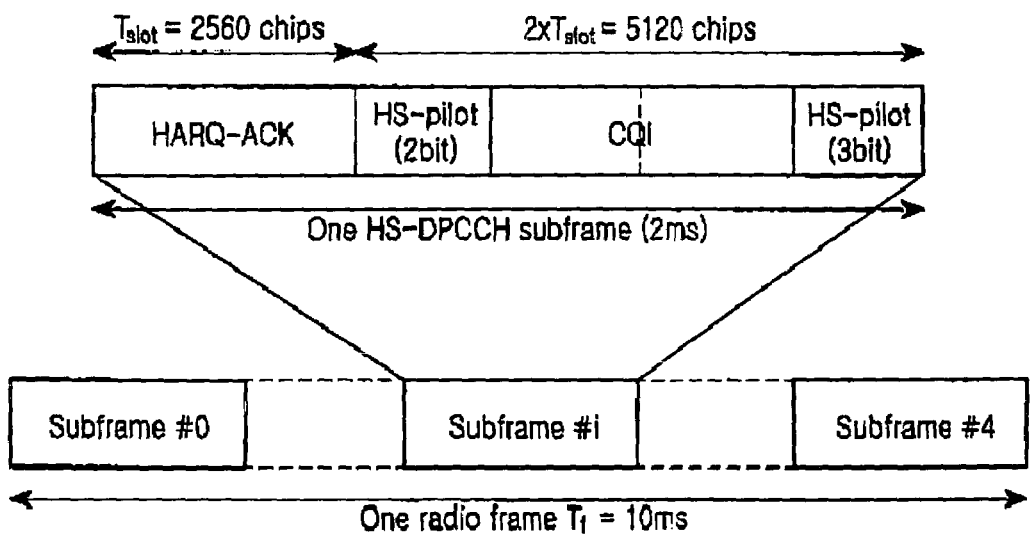
FIG. 7 illustrates a format of an HS-DPCCH channel, which is an uplink control channel for HSDPA, wherein a pilot is inserted in the HS-DPCCH.

The first embodiment of the present invention proposes a method for improving transmission reliability of CQI information when no HS-Pilot is inserted in a subframe of HS-DPCCH as illustrated in FIG. 6, and when 5 HS-Pilot bits are inserted in a subframe of HS-DPCCH (for example, 2-bit HS-Pilot is inserted in a second slot and 3-bit HS-Pilot is inserted in a third slot) as illustrated in FIG. 7.

With reference to FIG. 6, a description will be made regarding the case where no HS-Pilot is inserted in a subframe of HS-DPCCH. A UE encodes 5-bit CQI information into 20 bits in order to transmit HS-DPCCH. In order to encode the 5-bit CQI information into 20 bits, orthogonal codes of length 20 are required. Table 2 shows an example of linear combinations $M_{i,0}, M_{i,1}, M_{i,2}, M_{i,3}, M_{i,4}$ of 5 basis vectors of length 20 corresponding to the orthogonal codes of length 20. That is, Table 2 shows an example of basis vectors for CQI coding when no pilot is inserted in the HS-DPCCH, which is an uplink control channel for supporting an HSDPA service.

TABLE 2

| I | $M_{i,0}$ | $M_{i,1}$ | $M_{i,2}$ | $M_{i,3}$ | $M_{i,4}$ |
| --- | --- | --- | --- | --- | --- |
| 0  | 1 | 0 | 0 | 0 | 1 |
| 1  | 0 | 1 | 0 | 0 | 1 |
| 2  | 1 | 1 | 0 | 0 | 1 |
| 3  | 0 | 0 | 1 | 0 | 1 |
| 4  | 1 | 0 | 1 | 0 | 1 |
| 5  | 0 | 1 | 1 | 0 | 1 |
| 6  | 1 | 1 | 1 | 0 | 1 |
| 7  | 0 | 0 | 0 | 1 | 1 |
| 8  | 1 | 0 | 0 | 1 | 1 |
| 9  | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 0 | 1 |

It is possible to apply optimal (20,5) channel encoding in accordance with Equation (1) below by linear combinations of the 5 basis vectors of length 20 shown in Table 2.

$$b_i = \sum_{n=0}^{4} (a_n M_{i,n}) \bmod 2, \; i = 0, 1, \ldots, 19 \quad (1)$$

In Equation (1), $a_n$ is a CQI information bit, $b_i$ is an output bit created by channel-coding a CQI information bit, and i is a parameter for designating a position of a particular bit among bits of an orthogonal code.

A method of coding a CQI channel at a coding rate (20,5) will be described herein below.

For 5-bit CQI information a=[0 1 1 0 0], a first bit $b_0$ among 20 output bits created by coding the 5-bit CQI information is calculated as follows by applying Equation (1) and Table 2.

$$\begin{aligned} b_0 &= (a_0 M_{0,0} + a_1 M_{0,1} + a_2 M_{0,2} + a_3 M_{0,3} + a_4 M_{0,4}) \bmod 2 \quad (2)\\ &= (0 \cdot 1 + 1 \cdot 0 + 1 \cdot 0 + 0 \cdot 0 + 0 \cdot 1) \bmod 2 \\ &= 0 \end{aligned}$$

In this manner, the remaining 19 bits $b_1$ to $b_{19}$ of a CQI codeword coded at a coding rate (20,5) can also be calculated.

Next, with reference to FIG. 7, a description will be made regarding the case where an HS-Pilot is inserted in a subframe of HS-DPCCH. A UE encodes 5-bit CQI information into 15 bits in order to transmit HS-DPCCH. In order to code the 5-bit CQI information into 15 bits, orthogonal codes of length 15 are required. Table 3 below shows an example of linear combinations $M_{i,0}, M_{i,1}, M_{i,2}, M_{i,3}, M_{i,4}$ of 5 basis vectors of length i=15 corresponding to the orthogonal codes of length 15. That is, Table 3 shows an example of basis vectors for CQI coding when a pilot is inserted in HS-DPCCH, which is an uplink control channel for supporting an HSDPA service.

TABLE 3

| I | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |

It is possible to apply optimal (15,5) channel coding in accordance with Equation (3) below by linear combinations of the 5 basis vectors of length 15 shown in Table 3.

$$b_i = \sum_{n=0}^{4} (a_n M_{i,n}) \bmod 2, \, i = 0, 1, \ldots, 14 \quad (3)$$

In Equation (3), $a_n$ is a CQI information bit, and $b_i$ is an output bit created by channel-coding a CQI information bit. The CQI channel coding at a coding rate (15,5) is different from the CQI channel coding at a coding rate (20,5) in basis vectors used in equations.

When transmitting 5 CQI information bits over HS-DPCCH, a UE determines whether to transmit an HS-Pilot over an HS-DPCCH according to detection/non-detection of an HS-SCCH. When no HS-Pilot is transmitted, CQI information bits are subjected to (20,5) coding using basis vectors of length 20 illustrated in Table 2. However, when an HS-Pilot is transmitted, the CQI information bits are subjected to (15,5) coding using basis vectors of length 15 illustrated in Table 3. Comparing basis vectors shown in Table 2 with basis vectors shown in Table 3, the basis vectors of Table 3 are first 15 bits excluding last 5 bits from 20 basis vector bits of Table 2. That is, of the outputs, $b_0, b_1, \ldots, b_{14}$ are commonly output even though any one of a (20,5) code and a (15,5) code is applied. Therefore, if the $b_0, b_1, \ldots, b_{14}$ are transmitted in the same positions regardless of whether a (20,5) code or a (15,5) code is used, a Node B can decode CQI information transmitted from a UE although the UE has failed to detect HS-SCCH. That is, a UE codes CQI information bits with a (20,5) code before transmission because of failure to detect HS-SCCH, and a Node B can receive desired CQI information bits even though coded bits from the UE are decoded by a (15,5) code.

In order to apply the proposed technique, a permutation block is added to a structure for coding CQI information bits using a (20,5) code, to thereby change bit arrangement of codewords output by the coding. For example, coded bits $b_0, b_1, \ldots, b_{14}$ created by coding the basis vectors of Table 2 are arranged in a corresponding part where CQI is transmitted in a subframe of the HS-DPCCH illustrated in FIG. 7. The other coded bits $b_{15}, b_{16}, \ldots, b_{19}$ are arraigned in a corresponding part where 5-bit HS-Pilot is transmitted in the subframe of HS-DPCCH illustrated in FIG. 7. For example, $b_{15}$ and $b_{16}$ are arranged in an HS-Pilot position of a second slot, and $b_{17}$, $b_{18}$, and $b_{19}$ are arranged in an HS-Pilot position of a third slot. As a result, a Node B can acquire CQI information, although it performs a decoding operation on a (15,5) CQI codeword according to HS-DPCCH frame structure of FIG. 7. It is obvious that arrangement of the $b_{15}, b_{16}, \ldots,$ and $b_{19}$ can be appropriately dispersed according to a transmitted HS-Pilot.

Figure 8:
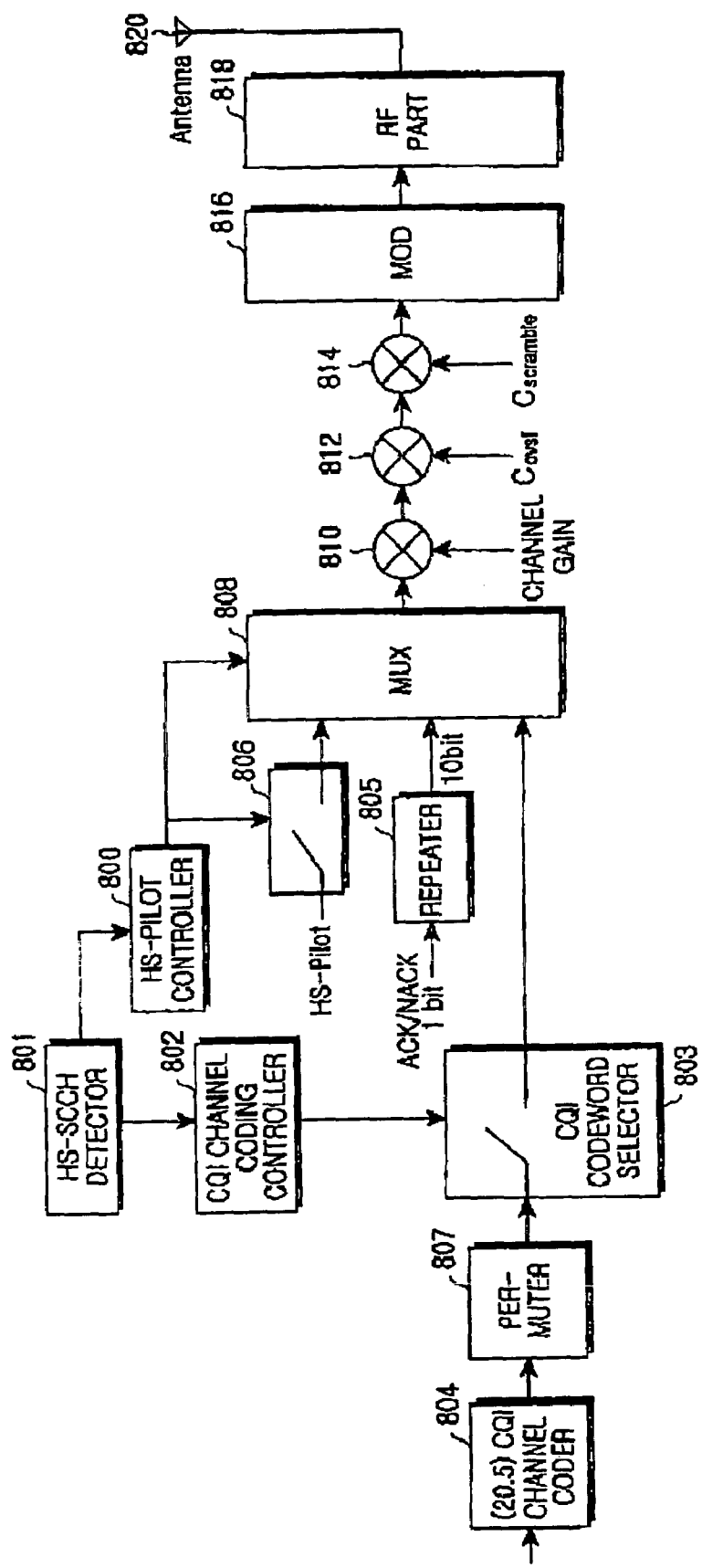
FIG. 8 illustrates a transmission apparatus of a UE according to a first embodiment of the present invention.

FIG. 8 illustrates a transmission apparatus of a UE according to an embodiment of the present invention, wherein a structure of only an HS-DPCCH directly related to the invention is illustrated among a DPCCH, a DPDCH, and the HS-DPCCH transmitted by a UE through an uplink. Referring to FIG. 8, 5-bit CQI information is applied to a (20,5) CQI channel coder 804. The (20,5) CQI channel coder 804 codes the CQI information using a basis vector illustrated in Table 2. Therefore, the CQI channel coder 804 outputs a codeword comprised of 20 coded bits. The codeword comprised of the 20 coded bits is delivered to a permuter 807. The permuter 807 permutes the coded bits so that a reception side can decode CQI information regardless of whether an HS-Pilot field exists in a subframe of the HS-DPCCH as described above. For example, of the coded bits, $b_0, b_1, \ldots, b_{14}$ are permuted to be located in a CQI field constituting a subframe of the HS-DPCCH. Further, of the coded bits, $b_{15}$ and $b_{16}$ are permuted to be located in an HS-Pilot field of a second slot, and $b_{17}$, $b_{18}$ and $b_{19}$ are permuted to be located in an HS-Pilot position of a third slot. To summarize, the output bits of the CQI codeword are permuted from $b_0, b_1, \ldots, b_{19}$ to $b_{15}, b_{16}, b_0, b_1, \ldots, b_{13}, b_{14}, b_{17}, b_{18}, b_{19}$. The permuted bits output from the permuter 807 are delivered to a codeword selector 803.

An HS-SCCH detector 801 determines whether an HS-SCCH from a Node B exists, and delivers the determination result to a CQI channel coding controller 802 and an HS-Pilot controller 800. The CQI channel coding controller 802 controls a CQI codeword selector 803 by determining output bits of a CQI codeword according to detection/non-detection (or presence/absence) of the HS-SCCH. The HS-Pilot controller 800 determines whether an HS-Pilot is inserted, according to detection/non-detection of the HS-SCCH. That is, if HS-SCCH is detected by the HS-SCCH detector 801, output bits of the CQI codeword information are determined as 15 bits, and accordingly, 5 HS-Pilot bits are inserted. Therefore, in this case, coded bits obtained at a (15,5) coding rate are output. However, if no HS-SCCH is detected by the HS-SCCH detector 801, 20 CQI codeword bits are all output and HS-pilot is not inserted. Therefore, in this case, coded bits obtained at a coding rate (20,5) are output.

A switch 806 delivers an HS-Pilot to a multiplexer 808, under the control of the HS-Pilot controller 800. 1-bit ACK/NACK information is repeated 10 times by a repeater 805, and then delivered to the multiplexer 808. The multiplexer 808 multiplexes ACK/NACK information, a CQI codeword and HS-Pilot, and outputs an HS-DPCCH subframe with a structure illustrated in FIG. 6 or 7. The subframe is multiplied by a channel gain in a first multiplier 810, and then spread with an OVSF code by a second multiplier 812. The spread signal is modulated into a bandpass signal by a modulator 816, after being scrambled by a third multiplier 814. Finally, the modulated signal is transmitted via an antenna 820 through a radio frequency (RF) part 818.

Figure 9:
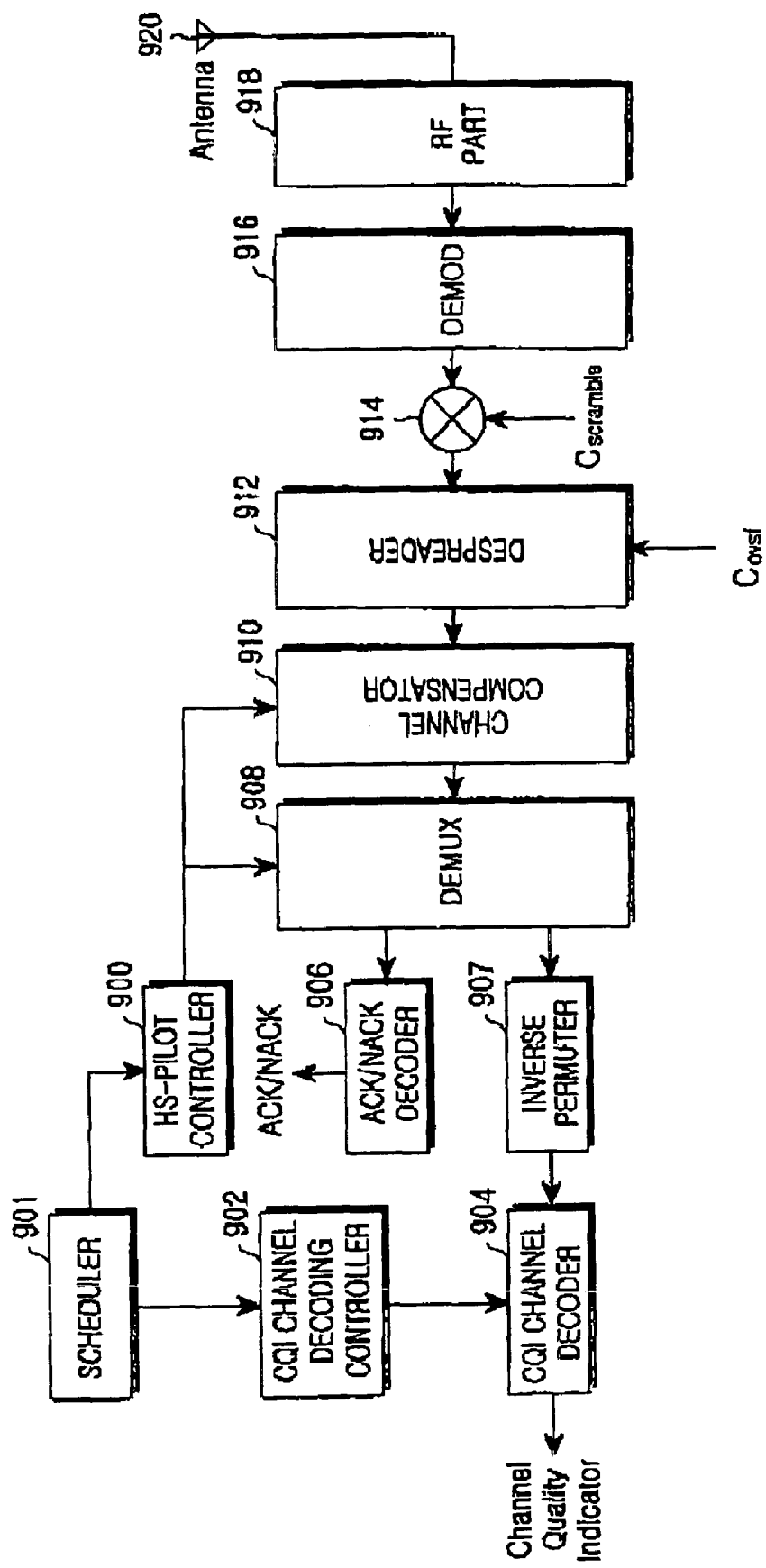
FIG. 9 illustrates a reception apparatus of a Node B according to the first embodiment of the present invention.

FIG. 9 illustrates a reception apparatus of a Node B corresponding to the transmission apparatus of the UE illustrated in FIG. 8. Referring to FIG. 9, a signal received from an antenna 920 is provided to a channel compensator 910 via an RF part 918, a demodulator 916, a descrambler 914, and a despreader 912 in the reverse order of the transmitter, and the channel compensator 910 compensates for channel distortion in the received signal. A channel estimation value for the channel compensation can be obtained using either a pilot bit of an existing uplink DPCCH or an HS-Pilot in case that the HS-Pilot is used. Because the channel compensator 910 and a demultiplexer 908 operate depending on a presence/absence of the HS-Pilot, they are controlled by an HS-Pilot controller 900. The HS-Pilot controller 900 is controlled by a Node B scheduler 901.

The scheduler 901 determines a presence/absence of the HS-SCCH previously transmitted to a corresponding UE, and provides a CQI codeword and HS-Pilot information for the received signal to a CQI channel decoding controller 902 and an HS-Pilot controller 900, respectively, according to the determination result. That is, it is determined that if HS-SCCH previously transmitted to a corresponding UE exists, the received signal is comprised of a 15-bit CQI codeword and 5-bit HS-Pilot. Otherwise, it is assumed that the received signal is comprised of only a 20-bit CQI codeword.

An output of the channel compensator 910 is separated into an ACK/NACK and a CQI codeword by the demultiplexer 908, and then finally decoded into 1-bit ACK/NACK information and 5-bit CQI information by an ACK/NACK decoder 906 and a CQI channel decoder 904, respectively. Because the CQI codeword output from the demultiplexer 908 was permuted in the UE transmitter, it must be de-permuted by an inverse permuter 907. The CQI channel decoder 904 is controlled by the CQI channel decoding controller 902. Here, the CQI channel decoder 904 performs decoding on a (20,5) code when no HS-Pilot transmitted, and the CQI channel decoder 904 performs decoding on a (15,5) code when an HS-Pilot is transmitted.

Figure 10:
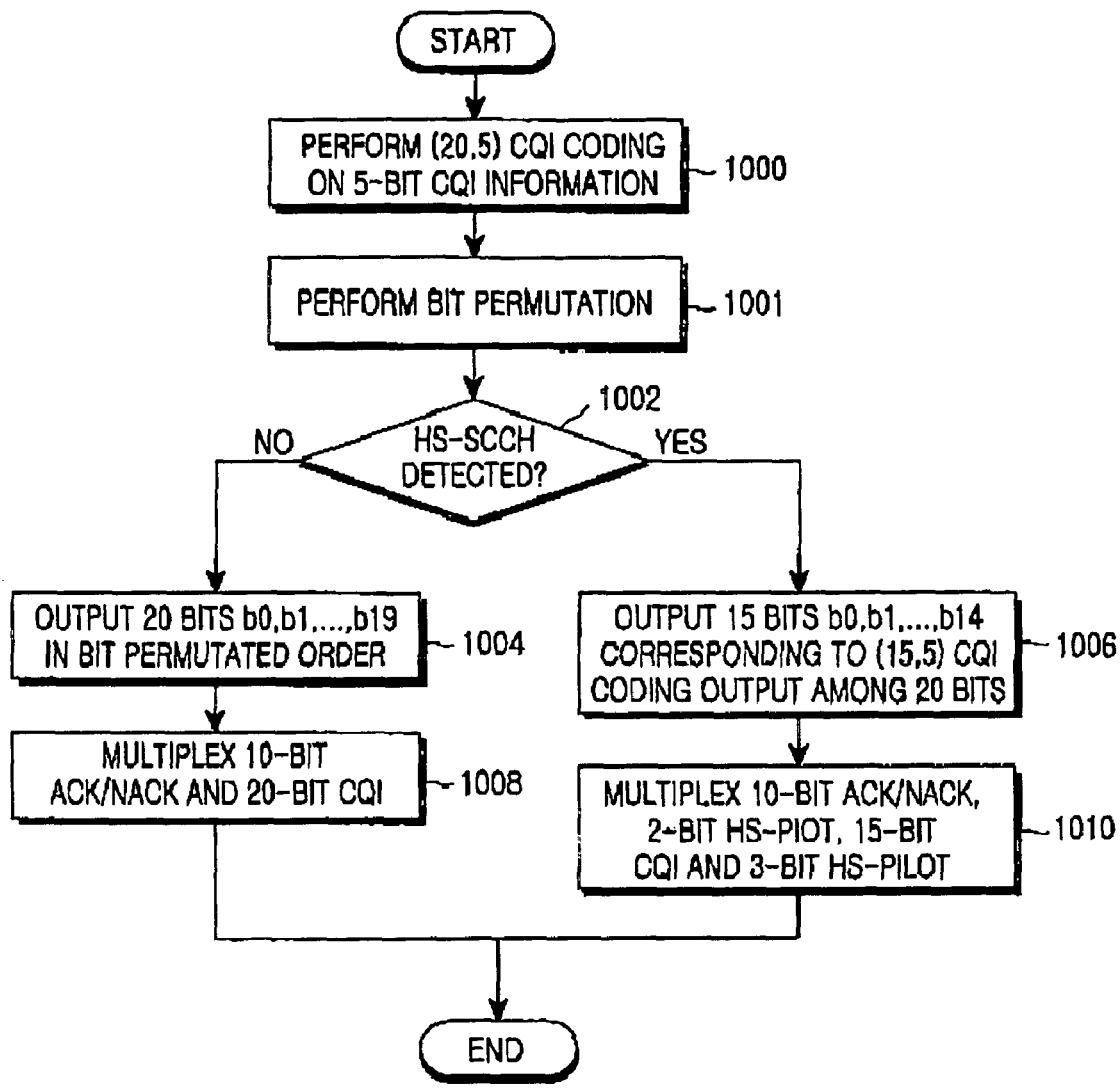
FIG. 10 is a flowchart illustrating a procedure for transmitting CQI information bits by a UE according to the first embodiment of the present invention.

FIG. 10 is a flowchart illustrating a procedure for transmitting CQI information bits by a UE according to the first embodiment of the present invention. Referring to FIG. 10, in step 1000, a UE performs CQI coding on 5 CQI information bits using a code with a coding rate (20,5) regardless of whether an HS-SCCH is detected, and outputs a CQI codeword comprised of 20 coded bits. In step 1001, the UE performs bit permutation on the 20-bit CQI codeword. For example, when a (15,5) code is used, $b_0, b_1, \ldots, b_{14}$ among the coded bits are permuted to be located in a CQI field constituting a subframe of an HS-DPCCH. Further, of the coded bits, $b_{15}$ and $b_{16}$ are permuted to be located in an HS-Pilot field of a second slot, while $b_{17}$, $b_{18}$ and $b_{19}$ are permuted to be located in an HS-Pilot field of a third slot. As an example of the permutation, a 20-bit codeword is output in order of $b_{15}, b_{16}, b_0, b_1, \ldots, b_{13}, b_{14}, b_{17}, b_{18}, b_{19}$.

In step 1002, the UE determines whether an HS-SCCH transmitted thereto from a Node B is detected. If no HS-SCCH is detected, the UE proceeds to step 1004, and if the HS-SCCH is detected, the UE proceeds to step 1006. In step 1004, the UE transmits the 20 permuted coded bits, and then in step 1008, the UE multiplexes the 10-bit coded ACKI-NACK information and the permuted 20 coded bits before transmission.

However, in step 1006, the UE outputs only 15 bits, i.e., $b_0, b_1, \ldots, b_{14}$, corresponding to outputs of a (15,5) CQI code, among the 20 permuted coded bits. In this embodiment, these bits correspond to remaining bits obtained by excluding the first 2 bits (bits coded with $b_{15}$ and $b_{16}$) and the last 3 bits (bits coded with $b_{17}$, $b_{18}$, and $b_{19}$) from the permuted bits $b_{15}, b_{16}, b_0, b_1, \ldots, b_{13}, b_{14}, b_{17}, b_{18}, b_{19}$. In step 1010, the UE performs multiplexing in order of the 10-bit coded ACK/NACK information, the 2 HS-Pilot bits, the 15 coded bits, and the 3-bit HS-Pilot before transmission.

Figure 11:
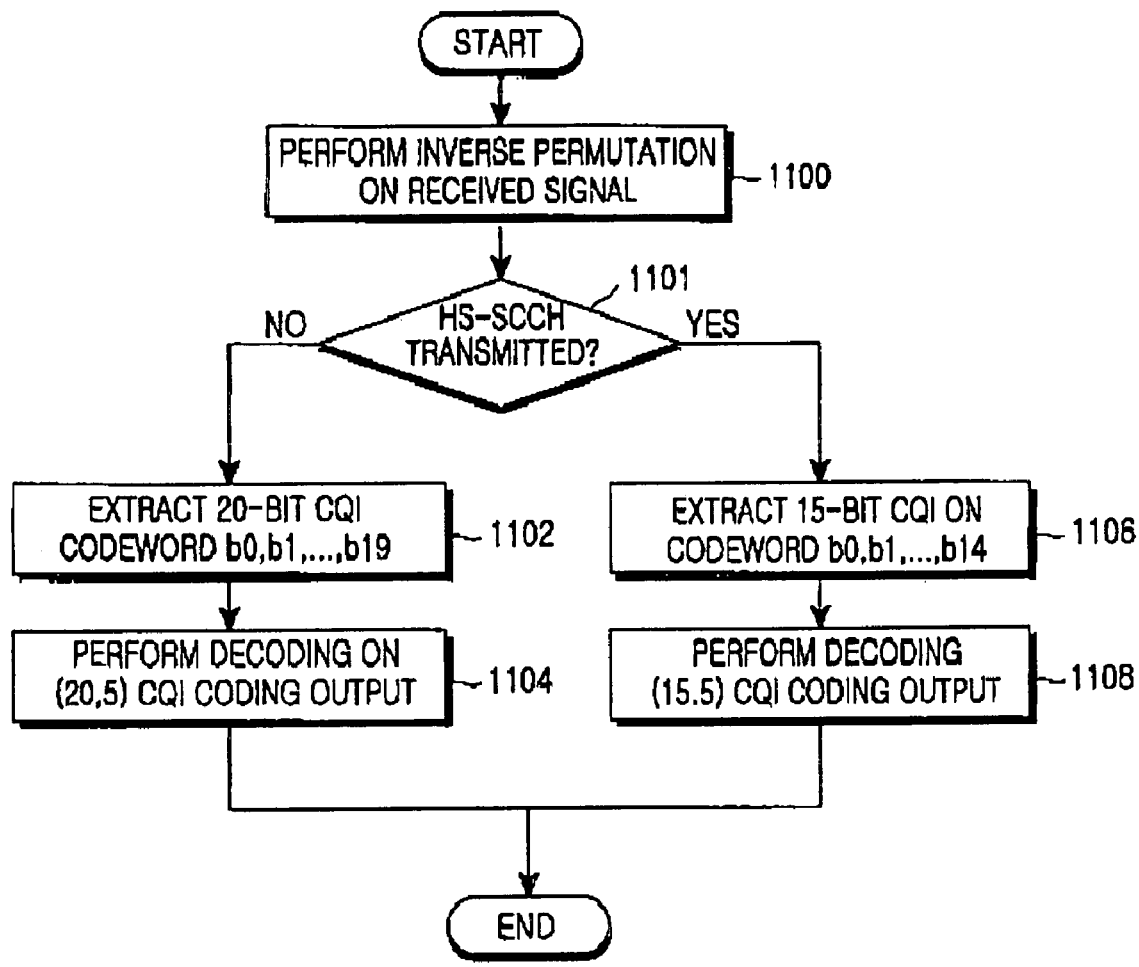
FIG. 11 is a flowchart illustrating a procedure for receiving CQI information by a Node B according to the first embodiment of the present invention.

FIG. 11 is a flowchart illustrating a procedure for receiving CQI information by a Node B according to the first embodiment of the present invention. Referring to FIG. 11, in step 1100, a Node B permutes an output signal excluding coded ACK/NACK information from signals output from a demultiplexer. At this point, the permutation is performed in the opposite order of permutation performed by a UE to transmit CQI information. Through permutation by a UE transmitter and inverse permutation by a Node B receiver proposed by the invention, it is possible to prevent CQI information acquisition failure, which may occur in a Node B due to an HS-SCCH detection error at a UE. That is, if a Node B transmitted an HS-SCCH over a downlink, the Node B expects that a CQI codeword coded with a (15,5) code will be received from a corresponding UE. However, if a CQI codeword coded with a (20,5) code was transmitted because an HS-SCCH detection error occurred at a UE, coding rates for a CQI codeword between a Node B and a UE are mismatched, and the Node B cannot acquire CQI information. However, as is shown in Table 2 and Table 3, it is possible to make the most use of the characteristic that two kinds of a (20,5) code and a (15,5) CQI code are identical in basis vectors through the first 15 bits. That is, if a 20-bit CQI codeword transmitted from a UE is permuted so that from the viewpoint of a Node B receiver, up to first 15 bits are equal to the bits coded with a (15,5) code, then a Node B can acquire CQI information without an error even though the CQI codeword is decoded with a (15,5) code.

In step 1101, the Node B determines by a scheduler whether an HS-SCCH was transmitted to a corresponding UE. If no HS-SCCH was transmitted, the Node B extracts a permuted 20-bit CQI codeword output in step 1102. In step 1104, the Node B decodes the output value with a (20,5) CQI code. However, if it is determined in step 1101 that an HS-SCCH was transmitted, the Node B outputs 15 bits among coded bits constituting the permuted CQI codeword in step 1106. Thereafter, in step 1108, the Node B decodes the 15 output coded bits with a (15,5) CQI code.

Through the above-described procedure, the present invention can prevent CQI information acquisition failure at a Node B due to an HS-SCCH detection error at a UE.

2. Second Embodiment

A second embodiment for changing bit arrangement of CQI codewords, proposed by the invention, can achieve the same result as the first embodiment that uses a permutation block by changing basis vectors used for CQI coding without using a permutation block added in the first embodiment. That is, by creating basis vectors for (20,5) CQI coding as shown in Table 4 below, it is possible to generate bit-permuted CQI codewords as in the first embodiment.

TABLE 4

| I | $M_{i,0}$ | $M_{i,1}$ | $M_{i,2}$ | $M_{i,3}$ | $M_{i,4}$ |
|---|---|---|---|---|---|
| 0 | 0 | 0 | 0 | 0 | 1 |
| 1 | 0 | 0 | 0 | 0 | 1 |
| 2 | 1 | 0 | 0 | 0 | 1 |
| 3 | 0 | 1 | 0 | 0 | 1 |
| 4 | 1 | 1 | 0 | 0 | 1 |
| 5 | 0 | 0 | 1 | 0 | 1 |
| 6 | 1 | 0 | 1 | 0 | 1 |
| 7 | 0 | 1 | 1 | 0 | 1 |
| 8 | 1 | 1 | 1 | 0 | 1 |
| 9 | 0 | 0 | 0 | 1 | 1 |
| 10 | 1 | 0 | 0 | 1 | 1 |
| 11 | 0 | 1 | 0 | 1 | 1 |

TABLE 4-continued

| I | $M_{i,0}$ | $M_{i,1}$ | $M_{i,2}$ | $M_{i,3}$ | $M_{i,4}$ |
|---|---|---|---|---|---|
| 12 | 1 | 1 | 0 | 1 | 1 |
| 13 | 0 | 0 | 1 | 1 | 1 |
| 14 | 1 | 0 | 1 | 1 | 1 |
| 15 | 0 | 1 | 1 | 1 | 1 |
| 16 | 1 | 1 | 1 | 1 | 1 |
| 17 | 0 | 0 | 0 | 0 | 1 |
| 18 | 0 | 0 | 0 | 0 | 1 |
| 19 | 0 | 0 | 0 | 0 | 1 |

Basis vectors of Table 4 are generated by reconstructing the basis vectors of Table 2. That is, basis vectors with i=15 and 16 of Table 2 are reconstructed as basis vectors with i=0 and 1 in Table 4, respectively, and basis vectors with i=0, . . . , 14 of Table 2 are reconstructed as basis vectors with i=2, . . . , 16 in Table 4, respectively. In addition, basis vectors with i=17, 18 and 19 of Table 2 are reconstructed as basis vectors with the same positions in Table 4, respectively.

Figure 12:
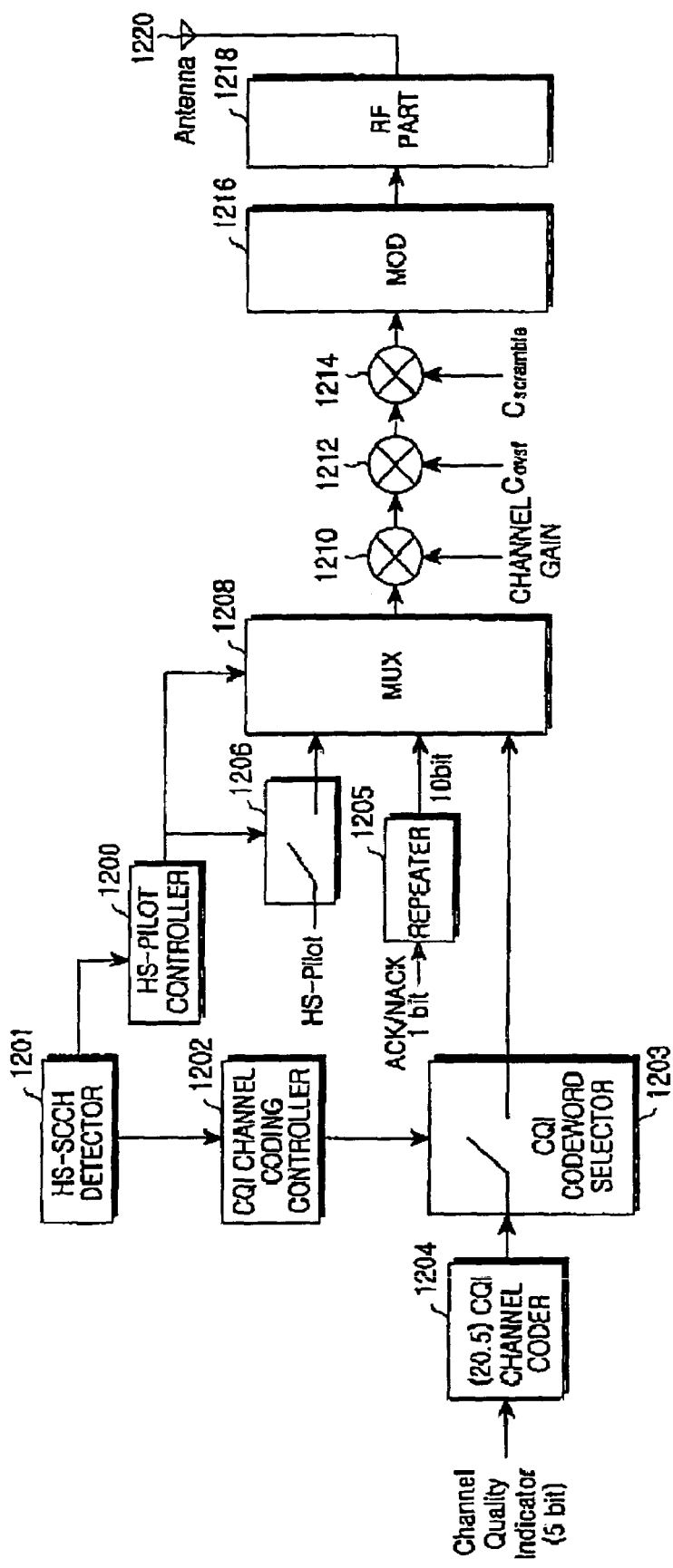
FIG. 12 illustrates a transmission apparatus of a UE according to a second embodiment of the present invention.

FIG. 12 illustrates a transmission apparatus of a UE according to a second embodiment of the present invention, wherein a structure of only an HS-DPCCH directly related to the invention is illustrated among a DPCCH, a DPDCH, and the HS-DPCCH transmitted by a UE through an uplink. Referring to FIG. 12, 5-bit CQI information is applied to a (20,5) CQI channel coder 1204. The (20,5) CQI channel coder 1204 codes the CQI information using a basis vector illustrated in Table 4. Therefore, the CQI channel coder 1204 outputs a codeword comprised of 20 coded bits through the coding. The codewords, as described above, are bit-permuted so that a reception side can decode CQI information regardless of a presence/absence of an HS-Pilot field in a subframe of HS-DPCCH. As a result, the reception side is not required to determine whether codewords are permuted. If CQI information is coded using Table 4, an order of output bits of a CQI codeword are permuted from $b_0, b_1, \ldots, b_{19}$ to $b_{15}, b_{16}, b_0, b_1, \ldots, b_{13}, b_{14}, b_{17}, b_{18}, b_{19}$. An output of the CQI channel coder 1204 is delivered to a CQI codeword selector 1203.

An HS-SCCH detector 1201 determines whether an HS-SCCH from a Node B exists, and delivers the determination result to a CQI channel coding controller 1202, and an HS-Pilot controller 1200. The CQI channel coding controller 1202 controls a CQI codeword selector 1203 by determining output bits of a CQI codeword according to a detection/non-detection (or presence/absence) of the HS-SCCH. The HS-Pilot controller 1200 determines whether an HS-Pilot is inserted, according to a detection/non-detection of the HS-SCCH. That is, if HS-SCCH is detected by the HS-SCCH detector 1201, output bits of the CQI codeword information are determined as 15 bits, and accordingly, 5 HS-Pilot bits are inserted. Therefore, in this case, coded bits obtained at a (15,5) coding rate are output. However, if no HS-SCCH is detected by the HS-SCCH detector 1201, 20 CQI codeword bits are all output and an HS-pilot is not inserted. Therefore, in this case, coded bits obtained at a coding rate (20,5) are output.

A switch 1206 delivers the HS-Pilot to a multiplexer 1208, under the control of the HS-Pilot controller 1200. 1-bit ACK/NACK information is repeated 10 times by a repeater 1205, and then delivered to the multiplexer 1208. The multiplexer 1208 multiplexes ACK/NACK information, a CQI codeword, and HS-Pilot, and outputs an HS-DPCCH subframe with a structure as illustrated in FIG. 6 or 7. The subframe is multiplied by a channel gain by a first multiplier 1210, and then spread with an OVSF code by a second multiplier 1212. The spread signal is modulated into a bandpass signal by a modulator 1216 after being scrambled by a third multiplier 1214. Finally, the modulated signal is transmitted via an antenna 1220 through an RF part 1218.

Figure 13:
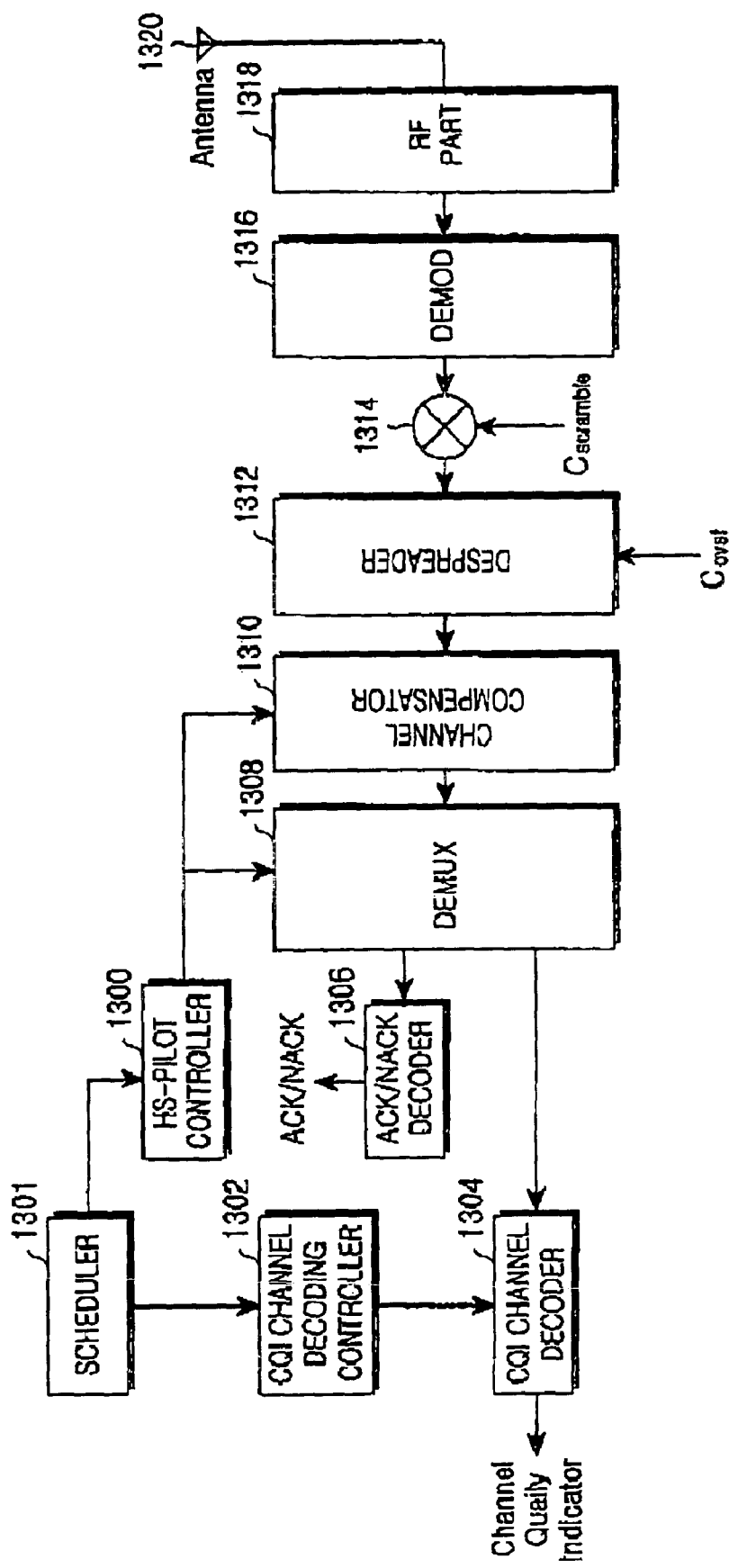
FIG. 13 illustrates a reception apparatus of a Node B according to the second embodiment of the present invention.

FIG. 13 illustrates a reception apparatus of a Node B corresponding to the transmission apparatus of the UE illustrated in FIG. 12. Referring to FIG. 13, a signal received from an antenna 1320 is provided to a channel compensator 1310 via an RF part 1318, a demodulator 1316, a descrambler 1314, and a despreader 1312 in the reverse order of the transmitter, and the channel compensator 1310 compensates for channel distortion in the received signal. A channel estimation value for the channel compensation can be obtained using either a pilot bit of an existing uplink DPCCH or an HS-Pilot in case that the HS-Pilot is used. Because the channel compensator 1310 and a demultiplexer 1308 operate depending on a presence/absence of the HS-Pilot, they are controlled by an HS-Pilot controller 1300. The HS-Pilot controller 1300 is controlled by a Node B scheduler 1301. The scheduler 1301 determines the presence/absence of the HS-SCCH previously transmitted to a corresponding UE, and provides the determination result to a CQI channel decoding controller 1302 and an HS-Pilot controller 1300, respectively. That is, if it is determined that the HS-SCCH previously transmitted to a corresponding UE exists, the received signal is comprised of 15 CQI codeword bits and 5 HS-Pilot bits. Otherwise, it is assumed that the received signal is comprised of only 20 CQI codeword bits. An output of the channel compensator 1310 is separated into an ACK/NACK and a CQI codeword by the demultiplexer 1308, and then finally decoded into 1-bit ACK/NACK information and 5-bit CQI information by an ACK/NACK decoder 1306 and a CQI channel decoder 1304, respectively. The CQI channel decoder 1304 is controlled by the CQI channel decoding controller 1302. Here, the CQI channel decoder 1304 performs decoding on a (20,5) code when no HS-Pilot is transmitted, and the CQI channel decoder 1304 performs decoding on a (15,5) code when an HS-Pilot is transmitted.

Figure 14:
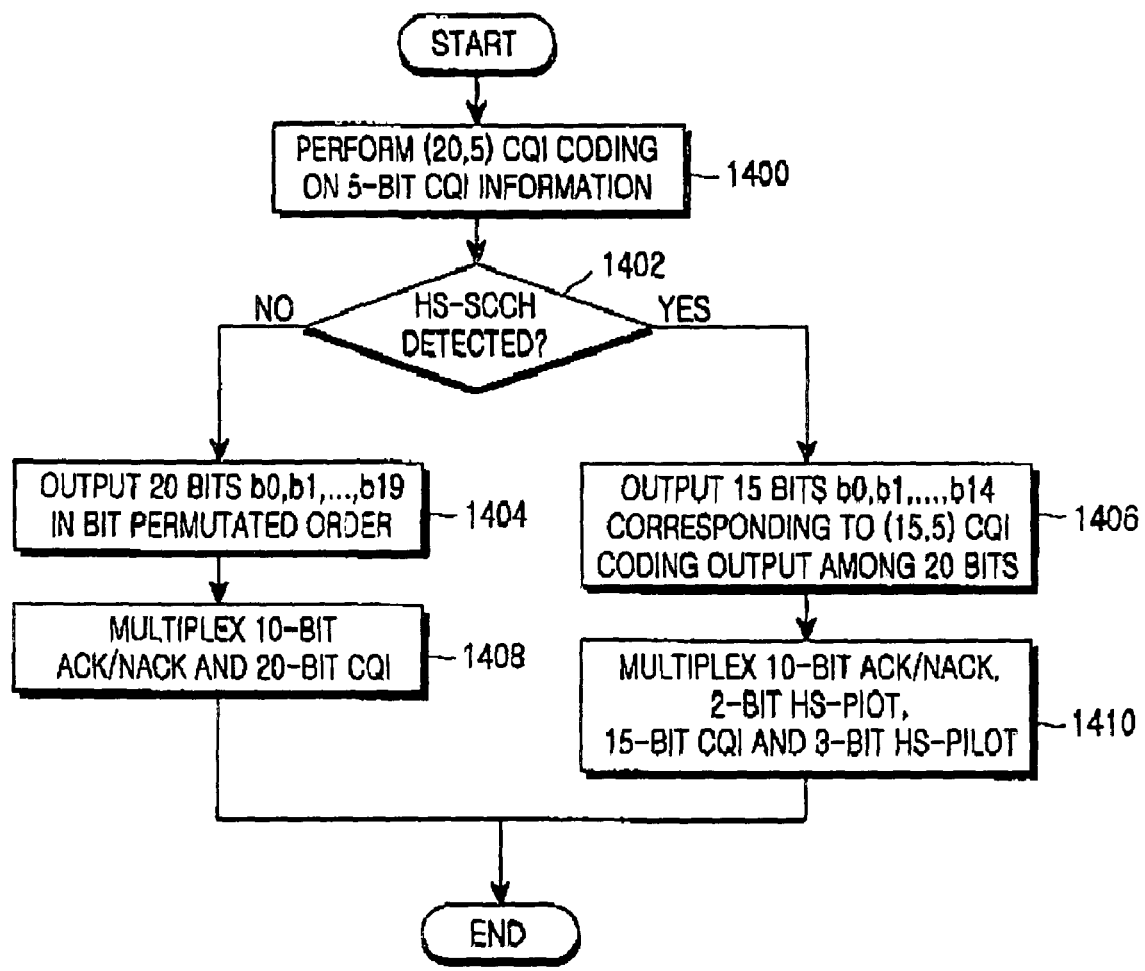
FIG. 14 is a flowchart illustrating a procedure for transmitting CQI information bits by a UE according to the second embodiment of the present invention.

FIG. 14 is a flowchart illustrating a procedure for transmitting CQI information bits by a UE according to the second embodiment of the present invention. Referring to FIG. 14, in step 1400, a UE performs CQI coding on 5 CQI information bits using a code with a coding rate (20,5) regardless of whether an HS-SCCH is detected, and outputs a CQI codeword comprised of 20 coded bits. At this point, a CQI codeword permuted using basis vectors of Table 4 is output. For example, of the coded bits, $b_0, b_1, \ldots, b_{14}$ are permuted to be located in a CQI field constituting a subframe of the HS-DPCCH. Further, of the coded bits, $b_{15}$ and $b_{16}$ are permuted to be located in an HS-Pilot field of a second slot, while $b_{17}$, $b_{18}$ and $b_{19}$ are permuted to be located in an HS-Pilot field of a third slot.

In step 1402, the UE determines whether an HS-SCCH transmitted thereto from a Node B is detected. If no HS-SCCH is detected, the UE proceeds to step 1404, and if the HS-SCCH is detected, the UE proceeds to step 1406. In step 1404, the UE outputs the 20 coded bits. In this embodiment, a 20-bit codeword is output in an order of $b_{15}, b_{16}, b_0,$ $b_1, \ldots, b_{13}, b_{14}, b_{17}, b_{18}, b_{19}$. In step 1408, the UE multiplexes the 10-bit coded ACK/NACK information and the 20 coded bits before transmission.

In step 1406, the UE outputs 15 bits, i.e., $b_0, b_1, \ldots, b_{14}$, corresponding to outputs of a (15,5) CQI code, in the permuted CQI codeword. In this embodiment, these bits correspond to remaining bits obtained by excluding first 2 bits ($b_{15}$ and $b_{16}$) and last 3 bits ($b_{17}$, $b_{18}$ and $b_{19}$) from the 20 permuted CQI codeword bits $b_{15}, b_{16}, b_0, b_1, \ldots, b_{13}, b_{14}, b_{17}, b_{18}, b_{19}$. In step 1410, the UE performs multiplexing in order of the 10-bit coded ACK/NACK information, the 2 HS-Pilot bits, the 15-bit CQI codeword, and the 3-bit HS-Pilot before transmission.

Figure 15:
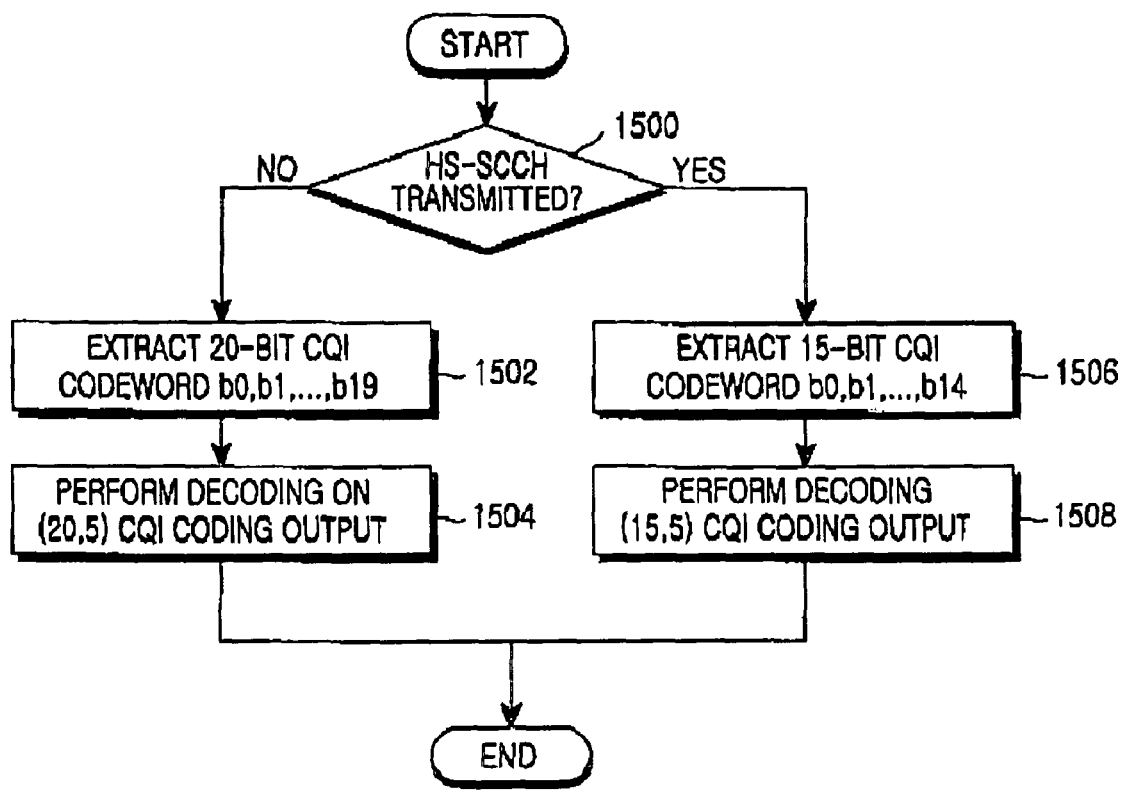
FIG. 15 is a flowchart illustrating a procedure for receiving CQI information bits by a Node B according to the second embodiment of the present invention.

FIG. 15 is a flowchart illustrating a procedure for receiving CQI information bits by a Node B according to a second embodiment of the present invention. Referring to FIG. 15, in step 1500, a Node B determines by a scheduler whether an HS-SCCH was transmitted to a corresponding UE. If no HS-SCCH was transmitted, the Node B extracts a permuted 20-bit CQI codeword output in step 1502. In step 1504, the Node B decodes the output value with a (20,5) CQI code. At this point, the Node B acquires CQI information by decoding the output bits using the basis vectors of Table 4. However, if it is determined in step 1501 that an HS-SCCH was transmitted, the Node B extracts 15 bits corresponding to a (15,5) CQI codeword from coded bits constituting the CQI codeword in step 1506. For example, referring to FIG. 7, the Node B extracts 15 bits from a CQI field of an HS-DPCCH subframe. Thereafter, in step 1508, the Node B decodes the 15 output coded bits with a (15,5) CQI code.

Through the above-described procedure, the present invention can prevent CQI information acquisition failure at a Node B due to an HS-SCCH detection error at a UE.

As described above, the present invention transmits CQI information bits so that a Node B can receive the CQI information bits regardless of whether a UE acquires an HS-SCCH, thereby improving reliability of CQI information.

While the present invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for transmitting, by a user equipment (UE) located in a soft handover region, channel quality indicator (CQI) information bits for informing a Node B of a quality of a downlink channel through a CQI field and a high speed pilot (HS-Pilot) field constituting a subframe of an uplink secondary dedicated physical control channel (DPCCH) in a code division multiple access (CDMA) communication system, the method comprising the steps of:

outputting a codeword of length 20 by coding the CQI information bits with a code of length 20, which is used when a high speed downlink packet access (HSDPA) service is not supported; and permuting 15 coded bits that are coded by the code as a code of length 15, which is used when the HSDPA service is supported, among the 20 coded bits constituting the codeword, thereby locating the 15 coded bits in the CQI field, and permuting the 5 remaining coded bits to be located in the HS-Pilot field.

2. The method of claim 1, wherein when the HSDPA service is provided, HS-Pilot bits are arranged in place of the 5 remaining coded bits permuted in the HS-Pilot field.

3. The method of claim 1, wherein the codeword $b_i$ of length 20 is output by $$b_i = \sum_{n=0}^{4} (a_n M_{i,n}) \bmod 2, \, i = 0, 1, \ldots, 19$$

where $a_n$ is a CQI information bit, and $M_{i,n}$ is a code of length 20.

4. The method of claim 3, wherein the 15 coded bits correspond to outputs $b_i$ determined by $$b_i = \sum_{n=0}^{4} (a_n M_{i,n}) \bmod 2, \, i = 0, 1, \ldots, 14$$

where $a_n$ is a CQI information bit, and $M_{i,n}$ is a code of length 20.

5. An apparatus for transmitting, by a user equipment (UE) located in a soft handover region, channel quality indicator (CQI) information bits for informing a Node B of a quality of a downlink channel through a CQI field and a high speed pilot (HS-Pilot) field constituting a subframe of an uplink secondary dedicated physical control channel (DPCCH) in a code division multiple access (CDMA) communication system, the apparatus comprising:

a coder for outputting a codeword of length 20 by coding the CQI information bits with a code of length 20, which is used when a high speed downlink packet access (HSDPA) service is not supported; and a permuter for permuting 15 coded bits that are coded by the code as a code of length 15, which is used when the HSDPA service is supported, among 20 coded bits constituting the codeword, thereby locating the 15 coded bits in the CQI field, and permuting the 5 remaining coded bits to be located in the HS-Pilot field.

6. The apparatus of claim 5, further comprising:

a controller for outputting a selection signal according to whether the HSDPA service is provided;

a codeword selector for outputting, upon receiving from the controller the selection signal indicating that the HSDPA service is provided, only the 15 coded bits permuted to be located in the CQI field among the 20 permuted coded bits, and outputting all of the 20 permuted coded bits, upon receiving from the controller the selection signal indicting that the HSDPA service is not provided;

a switch for outputting HS-Pilot bits from the HS-Pilot field, upon receiving from the controller the selection signal indicating that the HSDPA service is provided, and discarding the HS-Pilot bits, upon receiving from the controller the selection signal indicating that the HSDPA service is not provided; and a multiplexer for multiplexing coded bits for the codeword selector and HS-Pilot bits from the switch.

7. The apparatus of claim 5, wherein the codeword $b_i$ of length 20 is output by $$b_i = \sum_{n=0}^{4} (a_n M_{i,n}) \bmod 2, \, i = 0, 1, \ldots, 19$$

where $a_n$ is a CQI information bit, and $M_{i,n}$ is a code of length 20.

8. The apparatus of claim 7, wherein the 15 coded bits correspond to outputs $b_i$ determined by $$b_i = \sum_{n=0}^{4} (a_n M_{i,n}) \bmod 2, \, i = 0, 1, \ldots, 14$$

where $a_n$ is a CQI information bit, and $M_{i,n}$ is a code of length 15.

9. A method for receiving channel quality indicator (CQI) information bits in a Node B for a code division multiple access (CDMA) communication system when the CQI information bits indicating a quality of a downlink channel are permuted and then transmitted from a user equipment (UE) located in a soft handover region through a CQI field and a high speed pilot (HS-Pilot) field constituting a subframe of an uplink secondary dedicated physical control channel (DPCCH), the method comprising the steps of:

outputting a codeword of length 20 by permuting the CQI information bits transmitted through the CQI field and the HS-Pilot field in an opposite order of the permutation performed by the UE; and outputting the CQI information bits by decoding 20 coded bits constituting the codeword into a code of length 20, if a high speed downlink packet access (HSDPA) service is being provided to the UE, and decoding 20 coded bits constituting the codeword into a code of length 15, if the HSDPA service is not being provided to the UE.

10. An apparatus for receiving channel quality indicator (CQI) information bits in a Node B for a code division multiple access (CDMA) communication system when the CQI information bits indicating a quality of a downlink channel are permuted and then transmitted from a user equipment (UE) located in a soft handover region through a CQI field and a high speed pilot (HS-Pilot) field constituting a subframe of an uplink secondary dedicated physical control channel (DPCCH), the apparatus comprising:

a permuter for outputting a codeword of length 20 by permuting the CQI information bits transmitted through the CQI field and the HS-Pilot field in an opposite order of the permutation performed by the UE; and a decoder for outputting the CQI information bits by decoding 20 coded bits constituting the codeword into a code of length 20, if a high speed downlink packet access (HSDPA) service is being provided to the UE, and decoding the 20 coded bits constituting the codeword into a code of length 15, if the HSDPA service is not being provided to the UE.

11. A method for transmitting channel quality indicator (CQI) information bits for informing a Node B of a quality of a downlink channel through a subframe of an uplink secondary dedicated physical control channel (DPCCH) in a user equipment (UE) located in a soft handover region for a code division multiple access (CDMA) communication system, the method comprising the steps of:

outputting a codeword of length 20 by coding the CQI information bits with a basis vector stream generated by moving $16^{th}$ and $17^{th}$ basis vectors in a basis vector stream of length 20, which is used when a high speed downlink packet access (HSDPA) service is not supported, to positions of $1^{st}$ and $2^{nd}$ basis vectors and shifting basis vectors in $1^{st}$ to $15^{th}$ positions; and sequentially arranging the 20 coded bits constituting the codeword in a CQI field and a high-speed pilot (HS-Pilot) field constituting the subframe.

12. The method of claim 11, wherein when the HSDPA service is provided, HS-Pilot bits are arranged in place of the coded bits arranged in the HS-Pilot field.

13. An apparatus for transmitting channel quality indicator (CQI) information bits for informing a Node B of a quality of a downlink channel through a CQI field and a high speed pilot (HS-Pilot) field constituting a subframe of an uplink secondary dedicated physical control channel (DPCCH) in a user equipment (UE) located in a soft handover region for a code division multiple access (CDMA) communication system, the apparatus comprising:

a coder for outputting a codeword of length 20 by coding the CQI information bits with a basis vector stream generated by moving $16^{th}$ and $17^{th}$ basis vectors in a basis vector stream of length 20, which is used when a high speed downlink packet access (HSDPA) service is not used, to positions of $1^{st}$ and $2^{nd}$ basis vectors in the basis vector stream, and shifting $1^{st}$ to $15^{th}$ basis vectors;

a controller for outputting a selection signal according to whether the HSDPA service is provided;

a codeword selector for outputting only $3^{rd}$ to $17^{th}$ coded bits constituting the codeword, upon receiving from the controller the selection signal indicating that the HSDPA service is provided, and outputting all of the 20 coded bits constituting the codeword, upon receiving from the controller the selection signal indicating that the HSDPA service is not provided;

a switch for outputting HS-Pilot bits from the HS-Pilot field, upon receiving from the controller the selection signal indicting the HSDPA service is provided, and discarding the HS-Pilot bits upon receiving from the controller the selection signal indicating that the HSDPA service is not provided; and a multiplexer for multiplexing the coded bits from the codeword selector and the HS-Pilot bits from the switch.

14. A method for receiving channel quality indicator (CQI) information bits in a Node B for a code division multiple access (CDMA) communication system when the CQI information bits indicating a quality of a downlink channel are permuted and then transmitted from a user equipment (UE) located in a soft handover region through a CQI field and a high speed pilot (HS-Pilot) field constituting a subframe of an uplink secondary dedicated physical control channel (DPCCH), the method comprising the steps of:

extracting coded bits from the CQI field and the HS-Pilot field of the subframe; and outputting the CQI information bits by decoding the extracted coded bits with a basis vector stream generated by moving $16^{th}$ and $17^{th}$ basis vectors in a basis vector stream of length 20, which is used when a high speed packet data access (HSDPA) service is not supported, to positions of $1^{st}$ and $2^{nd}$ basis vectors, and shifting $1^{st}$ to $15^{th}$ basis vectors.

15. An apparatus for receiving channel quality indicator (CQI) information bits in a Node B for a code division multiple access (CDMA) mobile communication system when the CQI information bits indicating a quality of a downlink channel are permuted and then transmitted from a user equipment (UE) located in a soft handover region through a CQI field and a high speed pilot (HS-Pilot) field constituting a subframe of an uplink secondary dedicated physical control channel (DPCCH), the apparatus comprising:

a demultiplexer for extracting coded bits from the CQI field and the HS-Pilot field of the subframe; and a decoder for outputting the CQI information bits by decoding the extracted coded bits with a basis vector stream generated by moving $16^{th}$ and $17^{th}$ basis vectors in a basis vector stream of length 20, which is used when a high speed downlink packet access (HSDPA) service is not supported, to positions of $1^{st}$ and $2^{nd}$ basis vectors, and shifting $1^{st}$ to $15^{th}$ basis vectors.

* * * * *